(12) United States Patent
Yamazaki et al.

(10) Patent No.: US 6,707,465 B2
(45) Date of Patent: Mar. 16, 2004

(54) DATA PROCESSING APPARATUS AND METHOD, AND STORAGE MEDIUM

(75) Inventors: Takeshi Yamazaki, Tokyo (JP); Keiichi Iwamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 09/778,932

(22) Filed: Feb. 8, 2001

(65) Prior Publication Data

US 2001/0012019 A1 Aug. 9, 2001

(30) Foreign Application Priority Data

Feb. 9, 2000 (JP) ....................................... 2000-032259
Mar. 15, 2000 (JP) ....................................... 2000-072267

(51) Int. Cl.$^7$ .......................... G09G 5/02; H04N 7/167; H04N 11/00; B42D 15/00
(52) U.S. Cl. ...................... 345/629; 345/630; 345/638; 345/641; 380/200; 283/72; 283/113; 348/460
(58) Field of Search .................. 382/233, 232, 382/248, 250, 251, 100; 380/200–203, 232, 241, 253, 277, 278–285; 283/72–75, 100–107, 113; 705/5, 51, 57–59; 348/460; 345/629, 630, 632, 638, 844, 555, 556, 639, 641

(56) References Cited

U.S. PATENT DOCUMENTS

| | | | |
|---|---|---|---|
| 5,600,720 A | | 2/1997 | Iwamura et al. |
| 5,636,292 A | | 6/1997 | Rhoads |
| 5,666,419 A | | 9/1997 | Yamamoto et al. |
| 5,889,868 A | * | 3/1999 | Moskowitz et al. ........ 713/176 |
| 5,937,395 A | | 8/1999 | Iwamura |
| 5,949,885 A | * | 9/1999 | Leighton .................... 380/54 |
| 5,960,081 A | * | 9/1999 | Vynne et al. ............... 713/176 |
| 6,088,454 A | | 7/2000 | Nagashima et al. |
| 6,131,162 A | * | 10/2000 | Yoshiura et al. ............ 713/176 |
| 6,208,735 B1 | * | 3/2001 | Cox et al. .................... 380/54 |
| 6,233,684 B1 | * | 5/2001 | Stefik et al. ................. 713/176 |
| 6,246,775 B1 | * | 6/2001 | Nakamura et al. .......... 382/100 |
| 6,310,962 B1 | * | 10/2001 | Chung et al. ............... 382/100 |
| 6,332,030 B1 | * | 12/2001 | Manjunath et al. ......... 382/100 |
| 6,359,998 B1 | * | 3/2002 | Cooklev ..................... 382/100 |
| 6,389,402 B1 | * | 5/2002 | Ginter et al. ................. 705/51 |
| 6,411,725 B1 | * | 6/2002 | Rhoads ........................ 382/100 |

OTHER PUBLICATIONS

"Techniques for Data Hiding", Storage and Retrieval for Image and Video Databases III, W. Bender, et al., SPIE Proceedings, vol. 2420, pp164–173, Feb. 9–10, 1995.

"A Method of Watermarking Under Frequency Domain for Protecting Copyright of Digital Image", T. Nakamura, et al., SCIS'97–26A, The Institute of Electronics, Information and Communication Engineers, Jan. 1997.

"A Watermarking Scheme to Image Data by PN Sequence", J. Ohnishi, et al., SCIS'97–26B, The Institute of Electronics, Information and Communication Engineers, Jan. 1997.

(List continued on next page.)

Primary Examiner—Matthew C. Bella
Assistant Examiner—Wesner Sajous
(74) Attorney, Agent, or Firm—Fitzpatrick, Cella, Harper & Scinto

(57) ABSTRACT

This invention provides a technique capable of always keeping digital watermark information embedded in image data having the embedded digital watermark information by an optimum scheme on the basis of a time factor, or removing a digital watermark, or erasing the image data. An apparatus for achieving the above object has functions of holding image data having additional information embedded as a digital watermark, detecting time information related to the image data, and changing the embedding scheme for the additional information as the digital watermark embedded in the image data on the basis of the detected time information.

20 Claims, 17 Drawing Sheets

OTHER PUBLICATIONS

"On An Experimental Evaluation of Steganography with Wavelet Transform", H. Ishizuka, et al., SCIS'97–26D, The Institute of Electronics, Information and Communication Engineers, Jan. 1997.

"A Digital Watermark technique based on the Wavelet Transfor and its Robustness on Image Compression and Transformation", H. INour, et al., SCIS'98–3.2.A, The Institute of Electronics, Information and Communication Engineers, Jan. 1998.

* cited by examiner

1406 : TIME INFORMATION
1407 : ADDITIONAL INFORMATION

DATA PROCESSING APPARATUS AND METHOD, AND STORAGE MEDIUM

FIELD OF THE INVENTION

The present invention relates to a method and apparatus for managing digital watermark information to be embedded into digital data of an image or audio, and a storage medium which stores a program for executing the method.

BACKGROUND OF THE INVENTION

Recent development of computers and networks is remarkable, and various kinds of information such as text data, image data, and audio data are processed in a computer or network. Since such data is digital data, copy data with the same quality can be easily obtained. To protect the copyright for such data, copyright information or user information is often embedded into image data or audio data as a digital watermark. The digital watermark is a technique of executing predetermined processing for image data or audio data to secretly embed another information into the data.

When watermark information is extracted from data having a digital watermark embedded therein, the copyright information, user information, and identification information of the data can be obtained. In addition, an illicit copy can be traced using such an digital watermark.

As the first condition required for such a digital watermark, a watermark is embedded such that the embedded information is imperceptible, i.e., degradation in quality of original digital information is suppressed (quality). As the second condition, the watermark information embedded in digital information continues to remain, i.e., the embedded watermark information is not lost even by editing processing such as data compression or filtering or an attack such as alteration (resiliency). As the third condition, the amount of watermark information to be embedded can be selected in accordance with the application purpose (information amount). These conditions required for a digital watermark generally have tradeoff relationships. For example, when a highly resilient digital watermark is realized, degradation in quality becomes relatively large, or the embeddable watermark information amount becomes small in many cases.

For, e.g., a multilevel still image, the digital watermark embedding methods can be roughly classified into a scheme of embedding a watermark in the space domain and a scheme of embedding a watermark in the frequency domain. Various methods to be described below are known.

As the former scheme of embedding a digital watermark in the space domain by patchwork, an IBM scheme (W. Bender, D. Gruhl, & N. Morimoto, Techniques for Data Hiding, "Proceedings of the SPIE", San Jose Calif., USA, February 1995) and G. B. Rhoads & W. Linn; "Steganographymethods employing embedded", U.S. Pat. No. 5,636,292 are present.

Examples of the latter scheme of embedding a digital watermark in the frequency domain are an NTT scheme using the discrete cosine transform (Nakamura, Ogawa, & Takashima "Digital Watermarking Scheme in Frequency Domain for Copyright Protection of Digital Image", SCIS'97-26A, January 1997), a Defense Academy scheme using the discrete Fourier transform (Onishi, Oka, & Matsui, "Watermark Signature Method for Image Using PN Sequence", SCIS'97-26B, January 1997), a Mitsubishi/Kyushu University scheme using the discrete wavelet transform (Ishizuka, Sakai, & Sakurai, "Experimental Examination About Security and Reliability of Digital Watermark Technique Using Wavelet Transform", SCIS'97-26D, January 1997), and a Matsushita scheme (Inoue, Miyazaki, Yamamoto, & Katsura, "Robustness of Digital Watermark Image Compression and Transformation Based on Wavelet Transform", SCIS'98-3.2.A, January 1998) In the above schemes, digital watermark embedding processing and extraction processing are in a one-to-one correspondence. The schemes are not compatible with each other. As is generally said, the technique of embedding a digital watermark in the space domain suffers little degradation in quality but is poor in resiliency, while the scheme using frequency transform suffers large degradation in quality but is excellent in resiliency. These schemes have different characteristic features, so some techniques are excellent in resiliency but can embed only a small amount of watermark information, and some techniques suffer little degradation in quality but are poor in resiliency. In addition, to protect information having a watermark, the algorithm for embedding the digital watermark, and information representing the embedding position or change amount (to be referred to as a key hereinafter) are often kept secret. This aims at increasing the resiliency against an intentional attack of trying to remove the digital watermark by analyzing the algorithm or embedding position.

A digital watermark is generally imperceptible to the human, though it is sometimes called an invisible digital watermark. In this case, a digital watermark that visibly synthetically displays a maker logo or the like on an original image is sometimes called a visible digital watermark.

As described above, there are various digital watermarking schemes.

Conventionally, no technique of managing the digital watermark information embedding scheme for image data on the basis of time information has been established. Hence, the digital watermarking scheme cannot be always optimized on the basis of the use period/use form of the image data.

In use of different digital watermarking schemes, even when watermark information embedded in an image is to be extracted, it cannot be done unless the scheme and version of digital watermark embedding are known in advance.

If an embedded watermark cannot be extracted, it cannot be determined whether the watermark is embedded by another scheme, or the embedded watermark is destroyed by an attack.

SUMMARY OF THE INVENTION

The present invention has been made in consideration of the above prior art, and has as its main object to provide a technique capable of always keeping digital watermark information embedded in image data by an optimum scheme on the basis of a time factor, or removing a digital watermark, or erasing the image data.

It is another object of the present invention to provide a data processing method and apparatus capable of efficiently coping with various digital watermarks and extracting the digital watermarks.

It is still another object of the present invention to provide a data processing method and apparatus capable of detecting various watermarks and also detecting whether the watermarks are destroyed by an attack or the like.

In order to attain the above described objects, a data processing apparatus of the present invention, comprises: holding means for holding image data having additional information embedded as a digital watermark; detection means for detecting time information related to the image data; and change means for changing an embedding scheme for the additional information as the digital watermark embedded in the image data on the basis of the detected time information.

In a data processing apparatus of the present invention, the data processing apparatus for embedding a digital watermark into digital data, comprises: watermark embedding means for embedding watermark information to be embedded into the digital data; and common watermark embedding means for embedding, into the digital data, version information for specifying a version of an embedding scheme used by the watermark embedding means.

Further, in a data processing apparatus of the present invention, the data processing apparatus for extracting the watermark information from the digital data in which the watermark information is embedded by the above described data processing apparatus, comprises: common watermark extraction means for extracting the version information embedded by said common watermark embedding means; specifying means for specifying, on the basis of the version information extracted by the common watermark extraction means, the version of the embedding scheme with which the watermark information is embedded into the digital data; selection means for selecting watermark extraction means capable of extracting watermark information corresponding to the version specified by the specifying means; and control means for controlling to extract the watermark information from the digital data using the watermark extraction means selected by the selection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will be described below in detail with reference to the accompanying drawings. The embodiments will be described assuming that digital data is image data. As such digital data, not only image data but also any other digital data such as audio data or document data can be used.

[First Embodiment]

Figure 1:
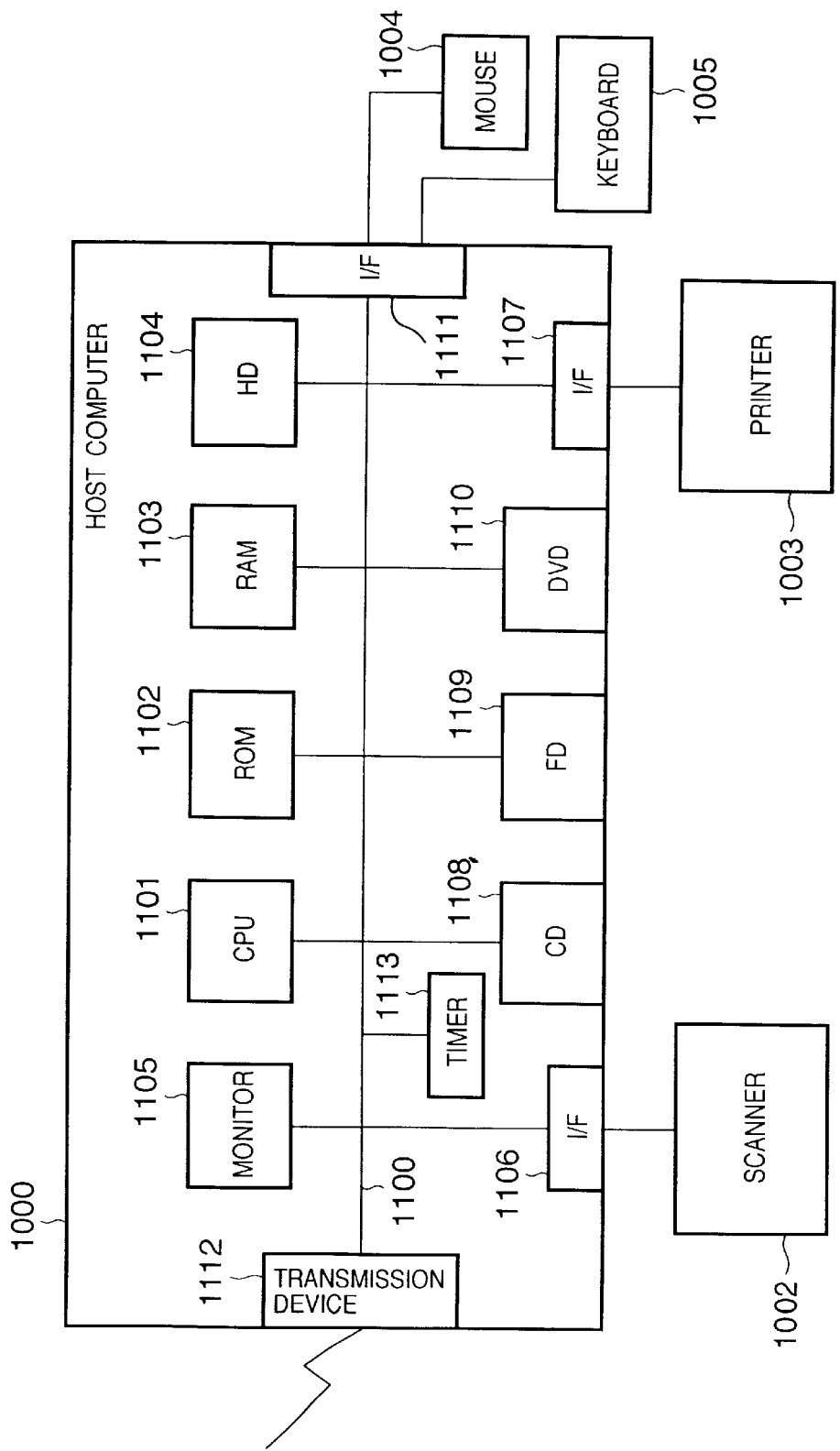
FIG. 1 is a view showing the overall arrangement of an image processing apparatus applied to the first embodiment of the present invention.

FIG. 1 is a view showing the overall arrangement of an image processing apparatus applied to the first embodiment of the present invention.

Referring to FIG. 1, a host computer 1000 is, e.g., a popular personal computer, which can input, edit, and save an image read by a scanner 1002. The image obtained here can be printed by a printer 1003. Various user's manual instructions are input from a mouse 1004 or keyboard 1005.

In this host computer 1000, blocks (to be described later) are connected through a bus 1100 to allow exchange of various data.

Referring to FIG. 1, a CPU 1101 controls the operations of the internal blocks or executes a program internally stored. A ROM 1102 stores in advance an image processing program and the like executed by the CPU 1101. A RAM 1103 temporarily stores a program or various data to be processed for processing by the CPU 1101. The RAM 1103 also has a function of holding current time information generated by a time generator such as a timer 1113 while updating it in units of 1/n sec. A hard disk (HD) 1104 stores a program or image data to be transferred to the RAM 1103 or the like, or saves processed image data. A monitor 1105 displays the processing situation while execution of various programs is progressing or displays image data before or after various processing operations. A scanner interface (I/F) 1106 connected to the scanner for reading an original or film by a CCD and generating image data receives the image data obtained by the scanner. A printer interface (I/F) 1107 connected to the printer 1003 capable of printing image data held in the host computer 1000 outputs image data to the printer 1003. A CD drive 1108 can read/write data from/onto a CD (or CD-R) as an external storage medium. An FD drive 1109 reads/writes data from/onto the FD 1109, like the CD drive 1108. A DVD drive 1110 also can read/write data from/onto a DVD, like the CD drive 1108. An interface (I/F) 1111 is connected to the mouse 1004 or keyboard 1005 to receive an instruction input therefrom. A transmission device 1112 includes a model capable of transmitting image data held at a portion of the host computer 1000 to an external device or receiving image data from the external device.

An image data management method in the first embodiment will be described below.

Figure 2:
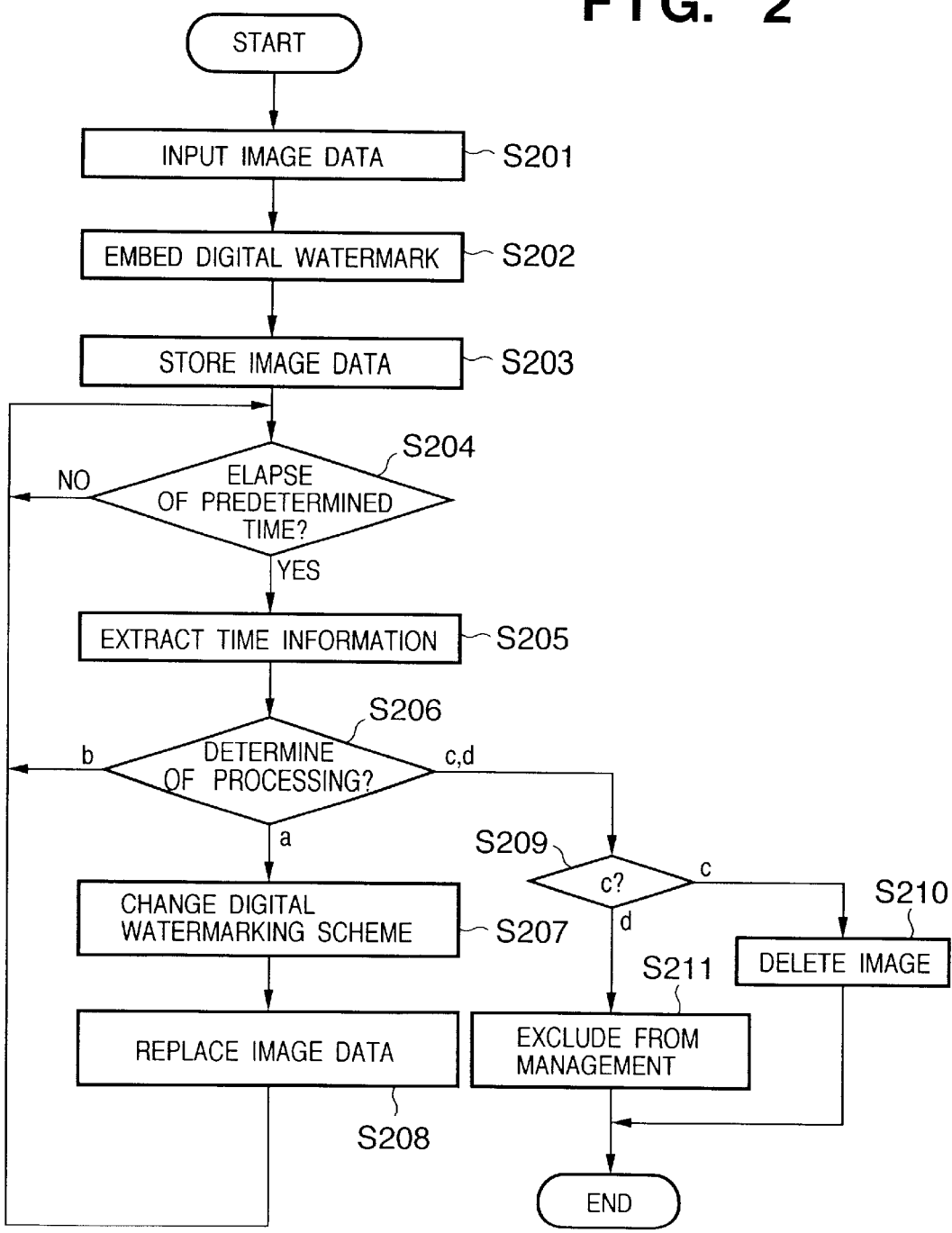
FIG. 2 is a flow chart showing the flow of operation in a host computer according to the first embodiment when image data is input and managed on the basis of time information to be described later.

FIG. 2 shows the flow of operation in the host computer 100 when image data is input and managed on the basis of time information (to be described later).

Image data is input in step S201. In this case, the image data is input by reading an original by the scanner 1002, loading image data from the CD 1108, FD 1109, or DVD 1110, or receiving image data from the transmission device 1112. The input image data is temporarily stored in the RAM 1103 for the next processing. When the capacity of the RAM 1103 is smaller than the data amount of the image data, the HD 1104 is also used.

The flow advances to step S202 to embed digital watermark information into the temporarily stored image data. The digital watermark information embedding method will be described with reference to FIG. 3.

Figure 3:
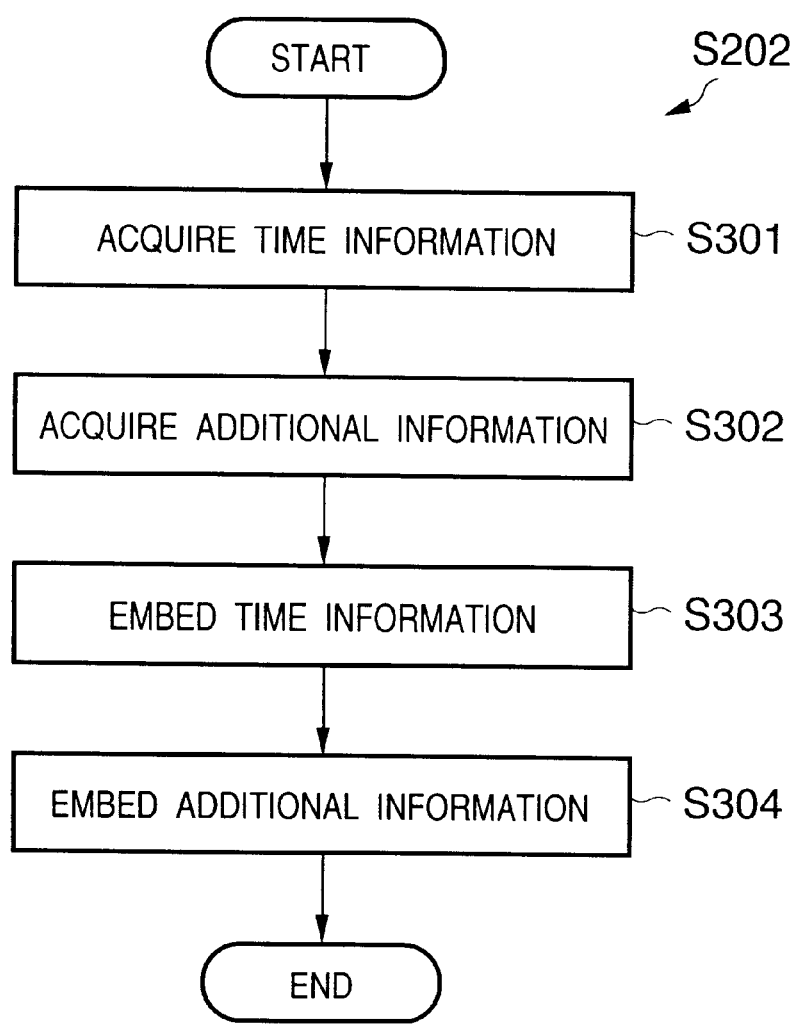
FIG. 3 is a flow chart showing a digital watermark embedding procedure in the first embodiment.

FIG. 3 is a flow chart showing the internal operation of step S202 in FIG. 2.

The time information of the image data is acquired in step S301. In the first embodiment, this time information is information representing the time when the host computer 1000 starts using the image data, i.e., the time when the image data is input in step S201 (or the time when the digital watermark information is embedded in step S202, which is counted by the timer 1113). In this case, the time information can be obtained by looking up time information updated and stored in the RAM 1103. The time information acquisition method is not limited to this. If image data is input from the transmission device 1112, time information may be simultaneously received. Additional information may be received by a bar code/optical card/magnetic card reader or the like. The time information can be the date and time of creation of the image data by the copyright holder in place of the input date and time of the image data, or if the image data is for sale, the date and time of sale of the image data. The time information obtained by one of the above methods is stored in the RAM 1103 as information to be embedded into the input image data.

The flow advances to step S302 to acquire additional information related to the image data and store the information in the RAM 1103. The additional information includes, e.g., the ID of the image data, copyright information (copyright holder or the like) or the input image data, and the attribute of the image (especially, information for limiting the use period/use form of the image data). The additional information can be input by the copyright holder of the image from the mouse 1004 or keyboard 1005 in FIG. 1. When the image data is received from the copyright holder through the transmission device 1112, the additional information may be simultaneously received. The additional information may be received by a bar code/optical card/magnetic card reader or the like. The additional information received by one of the above methods is stored in the RAM 1103 as information to be embedded into the input image data. The flow advances to step S303 to embed the time information acquired in step S301 into the image data as an invisible digital watermark. The flow advances to step S304 to embed the additional information acquired in step S302 into the image data as an invisible digital watermark.

In the first embodiment, the time information and additional information embedding processes (steps S303 and S304) may be executed as separate processes. However, in the first embodiment, a description will be made assuming that these processes are simultaneously executed by the scheme shown in FIG. 4.

Figure 4:
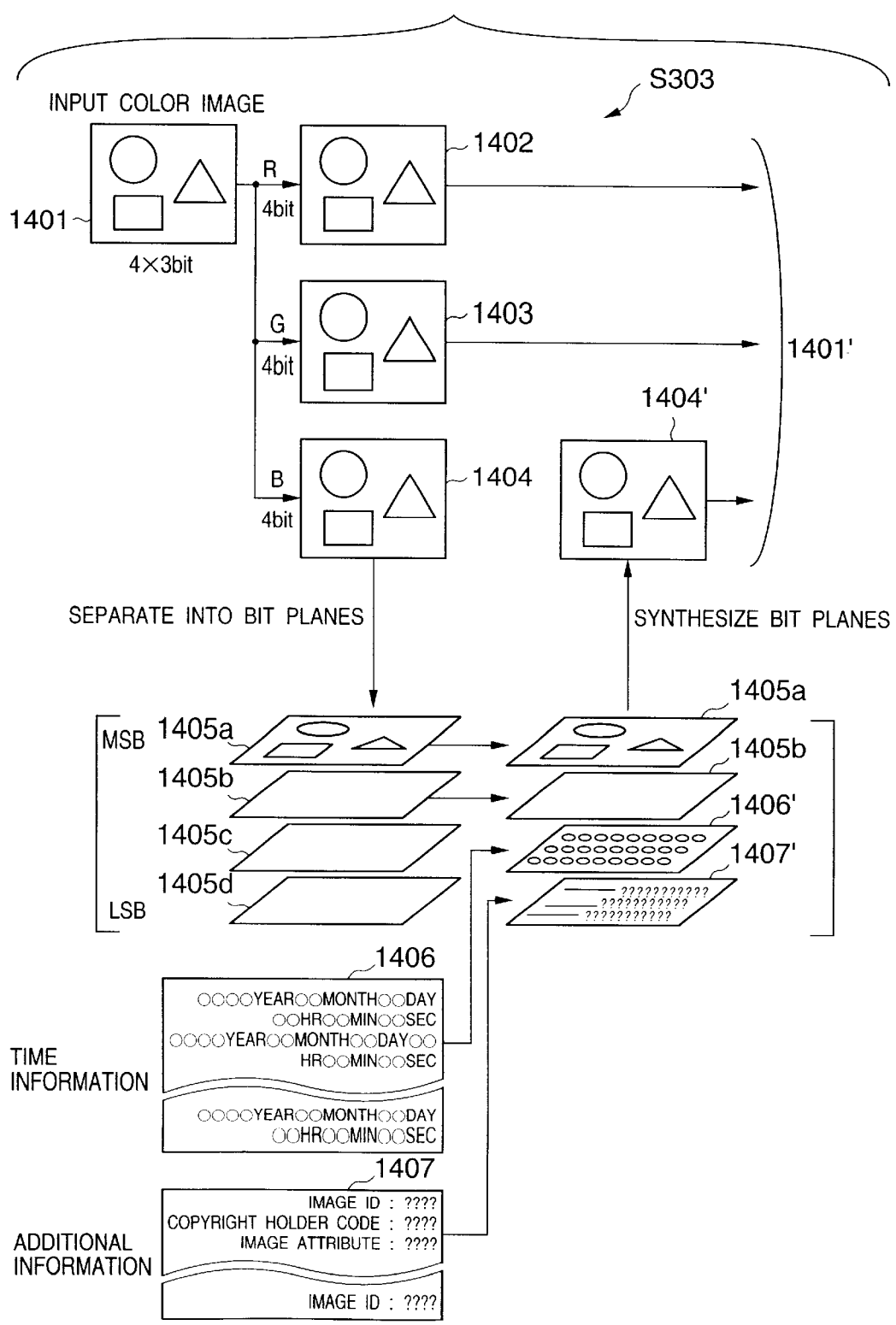
FIG. 4 is a view for explaining a processing example of steps S303 and S304 in the first embodiment.

Referring to FIG. 4, reference numeral 1401 denotes input image data. In this case, the image data is assumed to be color image data. The image data 1401 is separated into R, G, and B color components 1402 to 1404 (four bit/pixel). The time information is embedded into the B component.

The above-described time information is converted into a monochrome (binary) image 1406 shown in FIG. 4 and held in the RAM 1103. The above-described additional information is also converted into a monochrome (binary) image 1407 and held in the RAM 1103. In the image 1406 or 1407, identical pieces of time information or additional information are present periodically in the image. Hence, the time information or additional information can be detected from only part of the image 1406 or 1407. For the descriptive convenience, the time information and additional information to be embedded are converted into simple images. However, binary images which are obtained by encrypting the images 1406 and 1407 and have the same sizes as theirs may be used in place of these images 1406 and 1407.

When the B component 1404 is expressed by four bits per pixel, it can be separated into four bit planes 1405*a* to 1405*d*. The bit plane 1405*a* corresponds to the most significant bit and the bit plane 1405*d* to the least significant bit both in expressing the pixel density by four bits.

In the first embodiment, the second lower bit plane 1405*c* obtained here is replaced with the image 1406 obtained by converting the time information to form a bit plane 1406' (step S303), and the least significant bit plane 1405*d* is replaced with the image 1407 obtained by converting the additional information to form a bit plane 1407' (step S304).

That is, the bit planes 1405*a*, 1405*b*, 1406', and 1407' are subsequently used as four bit planes of the B component. The B component reconstructed by the above way is represented as a B component 1404'. The image undergoes no perceptible change because only the lower two bits are different between the B components 1404 and 1404'. Hence, this can be an invisible digital watermark.

In the first embodiment, the B component is expressed by a four-bit density for the descriptive convenience. However, when the input image is expressed as a full-color image (eight-bit density for each color), degradation in visual characteristics becomes smaller by the same processing as described above.

Referring to FIG. 4, finally, image data 1401' reconstructed from the R component 1402, G component 1403, and B component 1404' of the input image data is transferred to the next processing. With this processing, the time information and additional information can be embedded into the input image data.

The present invention is not limited to the above-described embodiment. For example, the input image can be not a color image but a monochrome image. In this case, the present invention can be realized by forcibly separating the monochrome image into R, G, and B components and processing them according to the procedure as described above. The embedding method is not limited to the above embodiment, either. For example, the image 1406 representing time information may be replaced with not the bit plane 1405*c* but the bit plane 1405*d*, and the image 1407 representing additional information may be replaced with not the least significant bit plane 1405*d* but the bit plane 1405*c*. However, to so embed time information as to be unnoticeable to the human eye, a bit as low as possible is preferably selected as a bit to be replaced.

When the above embedding operation (steps S202 and S301 to S304) is ended, the resultant image data (image data having time information and additional information embedded therein) is held by the HD 1104 and set as one of images to be managed by the host computer 1000 (step S203). The held image can be displayed on the monitor 1105 anytime.

When storage of the image data in step S203 is ended, the host computer 1000 continues to manage the image data. More specifically, each image data held in the HD 1104 is automatically extracted every predetermined time (one month/one week/one day/one hour), and time information is extracted from each image data. This extraction processing is done according to the procedure opposite to that for the time information embedding processing executed in step S202. More specifically, image data from which time information is to be extracted is separated into R, G, and B components shown in FIG. 4, and the third bit plane 1405*c* of the B component is extracted, thereby detecting embedded time information.

In the first embodiment, the additional information (corresponding to the image 1407 in FIG. 4) of the image data is also detected simultaneously with the processing in step S205, and the attribute of the image is also acquired (particularly, information for limiting the use period/use form of the image data).

The flow advances to step S206 to determine in consideration of the attribute of the image whether the time information from which the time information is extracted must be processed or which processing is to be executed.

As a detailed example, when the detected time information is "Feb. 19, 2000", the detected attribute of the image is "the image data can be unlimitedly used for 10 days (until Feb. 28, 2000), and after that (from Feb. 29, 2000), the image data can be used with a visible watermark", and the determined time in step S206 (current time information in the RAM 1103) is "Feb. 29, 2000", the processing advances from step S206 to step S207 as "case a". That is, the flow advances to processing of changing the scheme of the digital watermark embedded in the image data.

On the other hand, in the same attribute and determined time of this image, when the time information is "Feb. 24, 2000", the digital watermarking scheme need not particularly be changed. The flow returns from step S206 to step S204 as "case b", so the processing from step S205 is re-executed after the elapse of the predetermined time.

As another detailed example, when the detected time information is "Feb. 19, 2000", the detected attribute of the image is "the image data can be unlimitedly used for 10 days (until Feb. 28, 2000), and after that (from Feb. 29, 2000), the image data cannot be used", and the determined time in step S206 is "Feb. 29, 2000", the processing advances from step S206 to step S209 and then to step S210 as "case c". In step S210, the image data itself is deleted from the HD 1104.

As still another detailed example, when the detected time information is "Feb. 19, 2000", the detected attribute of the image is "the image data is in the managed state for 10 days (until Feb. 28, 2000), and after that (from Feb. 29, 2000), the image data is set in the unmanaged state", and the determined time in step S206 is "Feb. 29, 2000", the processing advances from step S206 to step S209 and then to step S211 as "case d". In step S211, the image data itself is kept stored in the HD 1104 but excluded from data to be managed (operation in FIG. 2) every predetermined time.

A variety of situations are plausible for the above processing/determination, and the image attributes may be combined.

For example, such an image attribute may be set that "after the image is input to the host computer 1000, the image data is unlimitedly usable for the first 10 days, usable with a visible watermark for the next 10 days, and then is set in the unmanaged state". In this case, when the time information detected in step S205 is "Feb. 19, 2000", and the determined time in step S206 is "Feb. 25, 2000", "case b" is selected. When the determined time is "Feb. 29, 2000", "case a" is selected because it is the 11th day of use. When the determined time is "Mar. 10, 2000", "case d" is selected. That is, according to the elapse of time, appropriately, the digital watermarking scheme can be changed, or the image can be deleted or excluded from data to be managed.

In step S207 executed in "case a", the digital watermarking scheme of the image data to be processed is changed. One scheme for this will be described.

Figure 5:
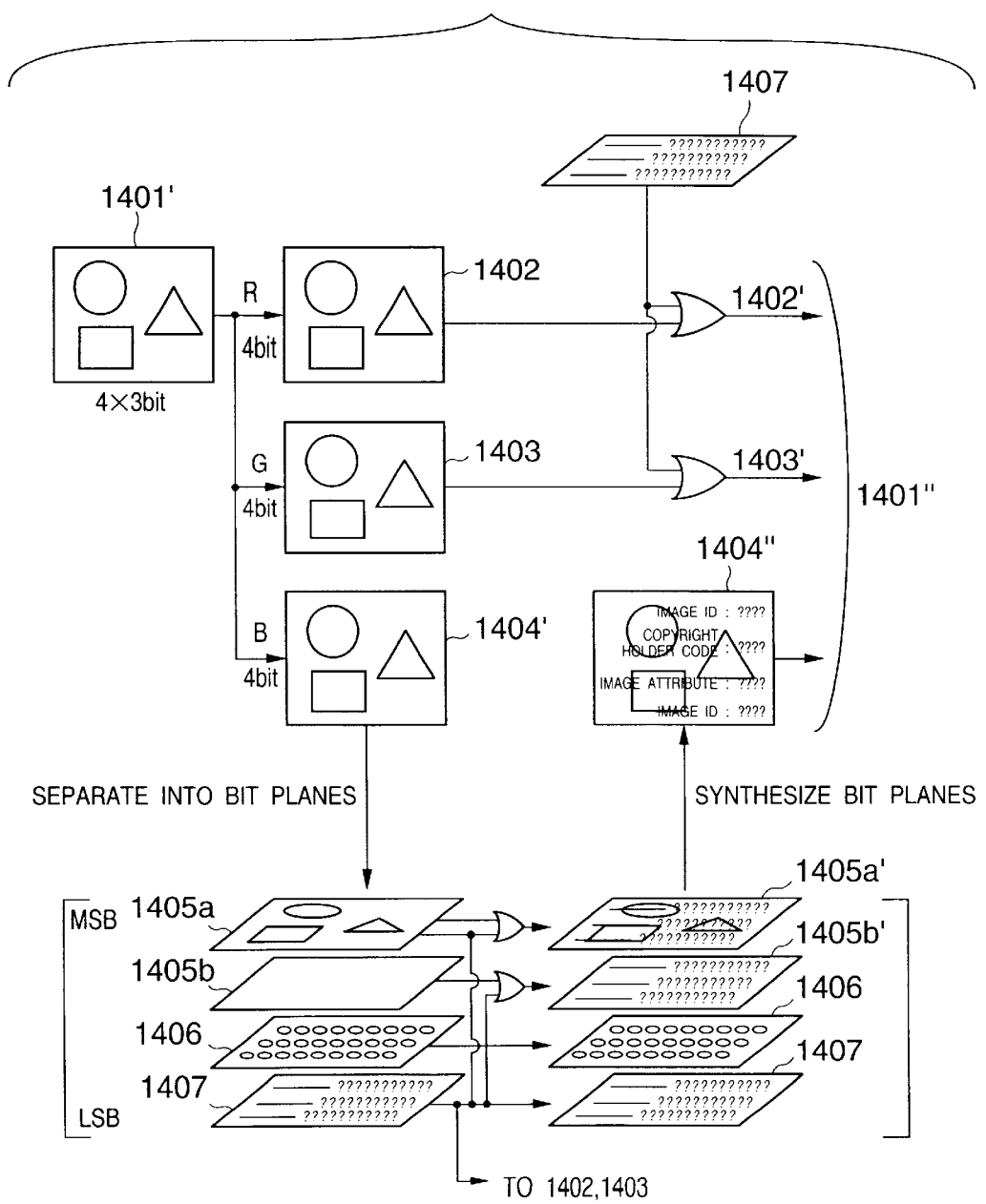
FIG. 5 is a view for explaining a processing example of step S207 in the first embodiment.

FIG. 5 shows a state wherein for image data having both time information and additional information embedded as invisible digital watermarks, the additional information is changed to a visible digital watermark while keeping the time information unchanged from the invisible digital watermark.

Referring to FIG. 5, the image data 1401' has time information and additional information embedded, as already described with reference to FIG. 4. This image data 1401' is separated into R, G, and B components, and then, the B component 1404' in which the pieces of information are embedded is separated into bit planes. The bit planes 1405*a*, 1405*b*, 1406, and 1407 are the same as in FIG. 4. When the upper bit planes 1405*a* and 1405*b* are ORed in units of pixels using the binary image 1407 corresponding to the least significant bit plane, the image 1407 representing the additional information in the B component can be made visible. That is, bit planes 1405*a*' and 1405*b*' obtained by this OR processing correspond to bit planes obtained by synthesizing the original bit planes 1405*a* and 1405*b* with the binary image 1407 of the additional information. A B component 1404" reconstructed using the bit planes 1405*a*', 1405*b*', 1406, and 1407 obtained here is subsequently used in place of the original B component 1404'.

On the other hand, four bit planes of each of the R and G components are also ORed using the binary image 1407 of the additional information to form images synthesized with the image 1407. Image data 1401" is reconstructed using the R, G, and B components 1402', 1403', and 1404" obtained by the above processing. This image data 1401" is subsequently used in place of the image data 1401'.

In the first embodiment, the simplified scheme incapable of completely reconstructing the image has been described for the descriptive convenience. However, the present invention is not limited to this, and a scheme capable of completely reconstructing the image may be applied. For example, the image can be appropriately completely reconstructed by attaching the bit planes 1405*c* and 1405*d* as part of the original image to the image data 1401".

When step S207 in FIG. 2 is ended, the resultant image data 1401" is stored in the HD 1104 in place of the image data 1401' (step S208). When the image data 1401" is displayed on the monitor 1105, the additional information is displayed so it is discernible by the human eye.

With the above operation, the image data input to the host computer 1000 is managed.

As described above, according to the first embodiment, in inputting, receiving, or purchasing image data, information for limiting the use period/use form of the image data is set by the copyright holder or the like whereby the image data can be managed in the apparatus (host computer 1000) such that the image data is reliably used complying with the use period/use form.

[Second Embodiment]

In the first embodiment, as the first additional information embedding scheme, an invisible digital watermark is embedded. However, the present invention is not limited to this. For example, invisible digital watermark information is embedded in step S303, though a visible digital watermark may be embedded in step S304. In this case, in the digital watermarking scheme changing processing in step S207, a visible digital watermarking scheme can be replaced with an invisible digital watermarking scheme, unlike the first embodiment in which the invisible digital watermarking scheme is changed to the visible digital watermarking scheme. A method in this case will be briefly described.

The basic arrangement of the second embodiment is the same as in FIG. 1, and a detailed description thereof will be omitted. The operation procedure for managing image data is also basically the same as that of the first embodiment (FIGS. 2 and 3), and a detailed description thereof will be omitted.

Image data is input and stored in step S201. The flow advances to step S202 to embed digital watermark information into the temporarily stored image data. This digital watermark information embedding method is also the same as in FIG. 3. A detailed example of the operations in steps S303 and S304 will be described with reference to the accompanying drawings.

Figure 6:
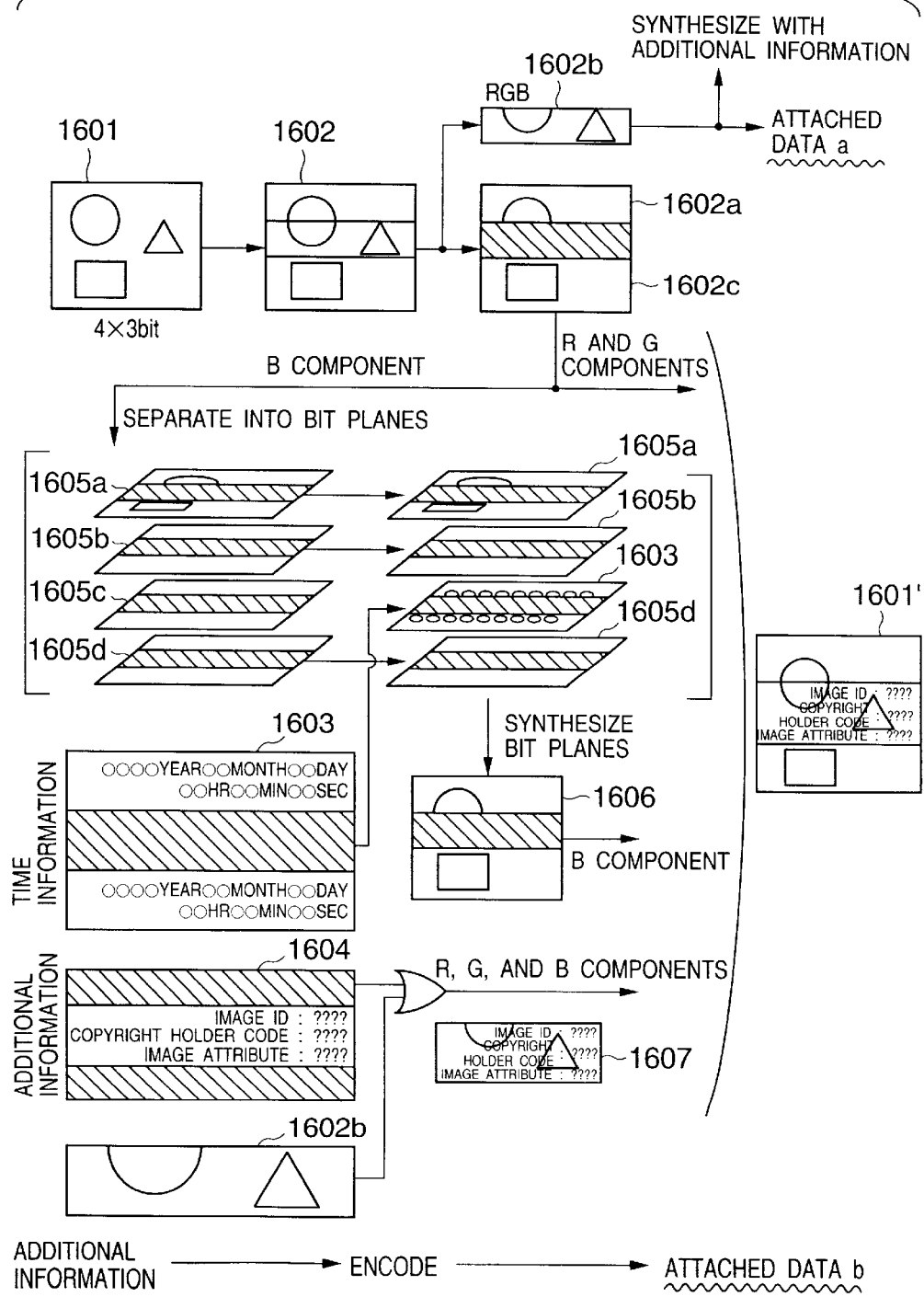
FIG. 6 is a view for explaining a processing example of steps S303 and S304 in the second embodiment of the present invention.

FIG. 6 shows a state wherein additional information is embedded as a visible digital watermark as the first digital watermark information embedding method in step S202 of FIG. 2.

Referring to FIG. 6, reference numeral 1601 denotes an image corresponding to the image data 1401 described in the first embodiment, in which each of the R, G, and B components is expressed by four bits. This image data is segmented into regions 1602. Additional information is to be embedded into a region, and time information is to be embedded into another region. A partial image 1602b corresponding to the region where the additional information (visible watermark information) is to be embedded is output as "attached data a" which is used to reconstruct the original image later as needed. This "attached data a" is attached to image data 1601' after conversion (to be described later). The partial image 1602b is also used as lookup information for embedding visible watermark information (to be described later).

On the other hand, for partial images 1602a and 1602c where time information (invisible watermark information) is to be embedded, components (R and G components) except the B component to be deformed to embed the invisible watermark are output as data used to construct the image data 1601' (to be described later). The partial images 1602a and 1602c corresponding to the B component are separated into four bit planes 1605a to 1605d, as in FIG. 4. The relatively lower bit plane 1605c is replaced with a binary image 1603 of time information obtained according to the same procedure as in the above-described first embodiment. The bit planes 1605a to 1605d and image 1603 have no image data corresponding to the partial image 1602b.

A new B component 1606 is formed by the four resultant bit planes 1605a, 1605b, 1603, and 1605d and output as the image data of the B component corresponding to the images 1602a or 1602c of the R or G component.

To construct the image data 1601' corresponding to an image obtained by embedding digital watermark information into the original image, an image (image in which the additional information is embedded as a visible watermark) replacing the partial image 1602b is generated. This is executed by synthesizing each of the bit planes (12 bit planes) of the R, G, and B components of the original image 1602b with the image 1604 obtaining by binarizing the additional information into an image having the same size as that of the original image 1601, as shown in FIG. 6. The generated image having the same size as that of the partial image 1602b (size corresponding to the central portion of the image 1601) is expressed as an image 1607.

The additional information is output as "attached data b" coded in consideration of later use.

When an image similar to the original image 1601 is reconstructed using the image data 1602a (only the R and G components), 1602c (only the R and G components), 1606, and 1607 obtained by the above processing, the image 1601' in which the additional information is added to the central portion of the image visibly to the human eye, and the time information is added to the upper and lower portions of the image invisibly to the human eye can be generated.

The resultant image 1601' is held in aHD 1104 together with the "attached data a" and "attached data b" and set as one of images to be managed by a host computer 1000 (step S203), as in the first embodiment. The held image can be displayed on a monitor 1105 anytime.

When storage of the image data in step S203 is ended, the host computer 1000 continues to manage the image data. This arrangement is also the same as in the first embodiment. More specifically, each image data held in the HD 1104 is automatically extracted every predetermined time, and time information is extracted from each image data. This extraction processing is done according to the procedure opposite to that for the time information embedding processing executed in step S202. In the second embodiment, the B component at the upper and lower portions of the image data 1601' from which time information is to be extracted, and the image 1603 representing the time information corresponding to the third bit plane of the B component is extracted, thereby detecting the time information.

In the second embodiment as well, the additional information (corresponding to the image 1604 in FIG. 6) of the image data is also detected simultaneously with the processing in step S205, and the attribute of the image is also acquired (particularly, information for limiting the use period/use form of the image data).

The flow advances to step S206 to determine in consideration of the attribute of the image whether the time information from which the time information is extracted must be processed or which processing is to be executed.

As a detailed example, when the detected time information is "Feb. 19, 2000", the detected attribute of the image is "the image data can be used with a visible watermark for 10 days (until Feb. 28, 2000), and after that (from Feb. 29, 2000), the image data can be used with an invisible watermark", and the determined time in step S206 (current time information in a RAM 1103) is "Feb. 29, 2000", the processing advances from step S206 to step S207 as "case a". That is, the flow advances to processing of changing the scheme of the digital watermark embedded in the image data.

On the other hand, in the same attribute and determined time of this image, when the time information is "Feb. 24, 2000", the digital watermarking scheme need not particularly be changed. The flow returns from step S206 to step S204 as "case b", so the processing from step S205 is re-executed after the elapse of the predetermined time.

As another detailed example, when the detected time information is "Feb. 19, 2000", the detected attribute of the image is "the image data can be used with a visible watermark for 10 days (until Feb. 28, 2000), and after that (from Feb. 29, 2000), the image data cannot be used", and the determined time in step S206 is "Feb. 29, 2000", the processing advances from step S206 to step S209 and then to step S210 as "case c". In step S210, the image data itself is deleted from the HD 1104.

As still another detailed example, when the detected time information is "Feb. 19, 2000", the detected attribute of the image is "the image data is in the managed state for 10 days (until Feb. 28, 2000), and after that (from Feb. 29, 2000), the image data is set in the unmanaged state", and the determined time in step S206 is "Feb. 29, 2000", the processing advances from step S206 to step S209 and then to step S211 as "case d". In step S211, the image data itself is kept stored in the HD 1104 but excluded from data to be managed (operation in FIG. 2) every predetermined time.

A variety of situations are plausible for the above processing/determination, and the image attributes may be combined.

For example, such an image attribute may be set that "after the image is input to the host computer 1000, the image data is usable with a visible watermark for the first 10 days, usable with an invisible watermark for the next 10 days, and then is set in the unmanaged state". In this case, when the time information detected in step S205 is "Feb. 19, 2000", and the determined time in step S206 is "Feb. 25, 2000", "case b" is selected. When the determined time is "Feb. 29, 2000", "case a" is selected because it is the 11th day of use. When the determined time is "Mar. 10, 2000", "case d" is selected.

In step S207 executed in "case a", the digital watermarking scheme of the image data as the processing target is changed. One scheme for this in the second embodiment will be described next.

Figure 7:
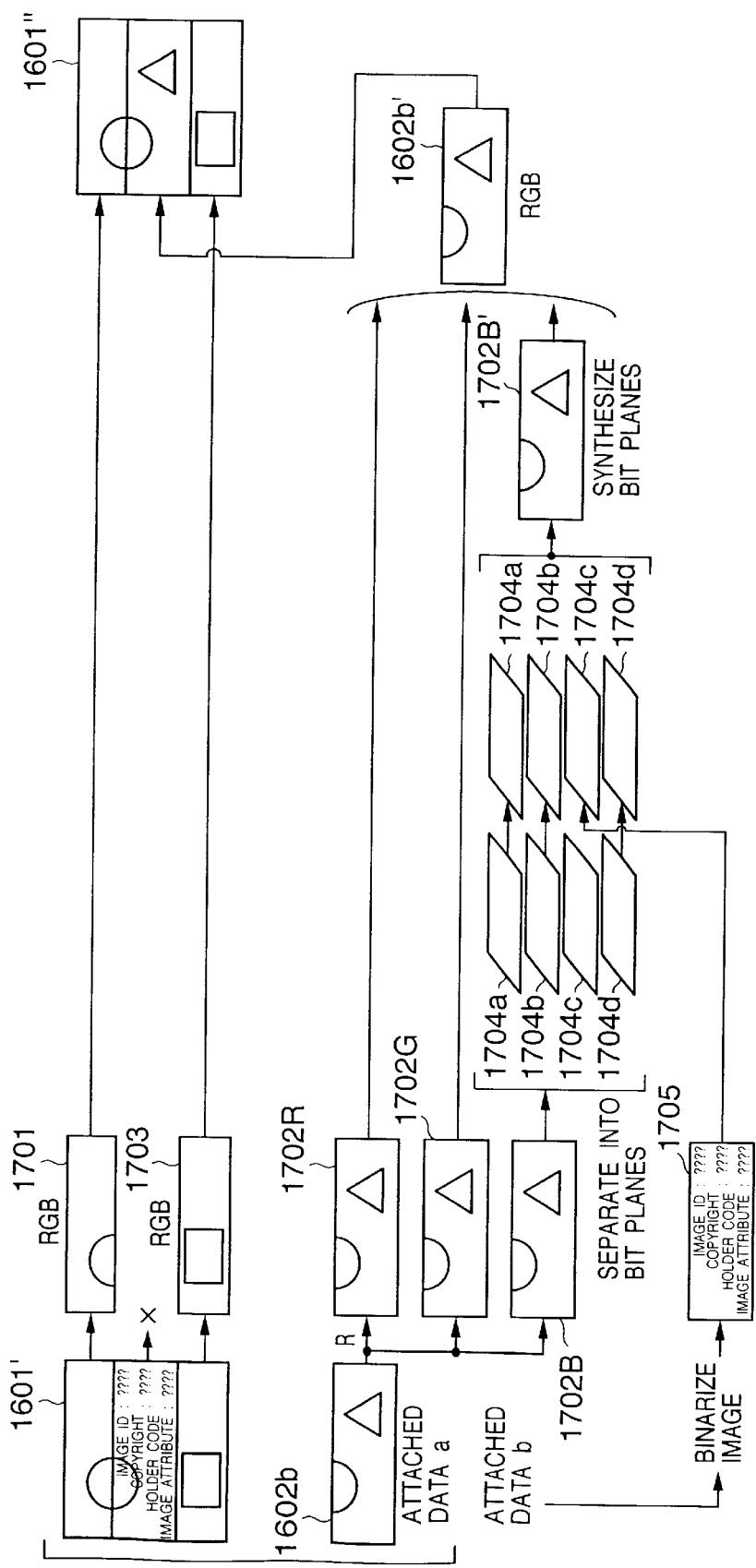
FIG. 7 is a view for explaining a processing example of step S207 in the second embodiment of the present invention.

FIG. 7 shows a state wherein the image data 1601' in which time information is embedded as an invisible digital watermark, and additional information is embedded as a visible digital watermark is changed to image data which has additional information as an invisible digital watermark.

Referring to FIG. 7, in the image data 1601', the time information and additional information are already embedded according to the procedure shown in FIG. 6. The image data 1601' has the "attached data a" and "attached data b" shown in FIG. 6.

First, the "attached data a" (1602b) is separated into R, G, and B components (1702R, 1702G, and 1702B). The B component 1702B to be converted in embedding the invisible digital watermark is separated into bit planes. Of bit planes 1704a to 1704d obtained here, the third upper bit plane 1704c is replaced with an image 1705 which is obtained by binarizing the "attached data b" (code of the additional information) and has the same size as that of the B component 1702B.

This method for this process is the same as in the above-described first embodiment. A B component 1702B' similar to the B component 1702B is reconstructed using the four resultant bit planes 1704a, 1704b, 1705, and 1704d. Image data 1602' similar to the "attached data a" 1602b is reconstructed using the reconstructed B component 1702B, R component 1702R, and G component 1702G and used as the central portion of the image 1601'. That is, the upper portion 1701 and lower portion 1703 of the image 1601' are used without any change, and the central portion of the image 1601' is replaced with the image data 1602'. With this processing, an image 1601" in which both time information and additional information are embedded as invisible watermark information is generated.

When step S207 in FIG. 2 is ended, the resultant image data 1601" is stored in the HD 1104 in place of the image data 1601' (step S208). When the image data 1601" is displayed on the monitor 1105, the additional information is displayed so it is not discernible by the human eye.

With the above operation, the image data input to the host computer 1000 is managed.

According to the second embodiment, in inputting, receiving, or purchasing image data, information for limiting the use period/use form of the image data is set by the copyright holder or the like whereby the image data can be managed in the apparatus (host computer 1000) such that the image data is reliably used complying with the use period/use form.

[Third Embodiment]

In the first and second embodiments, the method of embedding additional information into an image as a digital watermark (visible watermark/invisible watermark) is changed in step S207 of FIG. 2 by managing time information. However, the present invention is not limited to this.

For example, additional information embedded as a digital watermark can be removed by managing time information.

This processing can be executed by replacing the "attached data a" with the central portion of the image 1601' in processing of step S207 (processing in FIG. 7) in the second embodiment.

As a detailed example, when detected time information is "Feb. 19, 2000", the detected attribute of the image is "the image data can be used with a visible watermark for 10 days (until Feb. 28, 2000), and after that (from Feb. 29, 2000), the image data can be used with the watermark of additional information removed", and the determined time in step S206 (current time information in a RAM 1103) is "Feb. 29, 2000", the processing advances from step S206 to step S207 as "case a". In step S207, processing of executing the above-described additional information is executed, unlike the first and second embodiments.

[Fourth Embodiment]

In the first and second embodiments, in step S207 of FIG. 2, the method of embedding additional information into an image as a digital watermark is changed from a visible watermark to an invisible watermark or from an invisible watermark to a visible watermark. However, the present invention is not limited to this and also incorporates a change from a first invisible watermark method to a second invisible watermark method.

As a simple example, in the embedding method shown in FIG. 4, which is applied to the first embodiment, after image data 1401' is separated into bit planes 1402, 1403, and 1404' and further separated into bit planes 1405a, 1405b, 1406, and 1407, an image 1407' which appears to be different may be generated by rotating the bit plane 1407 through 180° or converting the bit plane 1407 into a mirror image, and the image 1401' similar to the original image may be reconstructed using the image 1407'. As another example, when the lower two bits of the bit planes 1405a, 1405b, 1406, and 1407 obtained by bit plane separation are exchanged with each other, and a B component similar to the image 1404' is reconstructed again using the 1405*a*, 1405*b*, 1407, and 1406 in this order, thereby reconstructing the image 1401', the first invisible watermark can be changed to the second invisible watermark.

As a detailed example, when detected time information is "Feb. 19, 2000", the detected attribute of the image is "the image data can be used with additional information embedded by the first invisible watermarking scheme for 10 days (until Feb. 28, 2000), and after that (from Feb. 29, 2000), the image data can be used with the additional information embedded by the second invisible watermarking scheme", and the determined time in step S206 (current time information in a RAM 1103) is "Feb. 29, 2000", processing advances from step S206 to step S207 as "case a". In step S207, the additional information is changed from the first invisible watermark to the second invisible watermark by the above-described method.

[Fifth Embodiment]

The present invention also incorporates a change from a first visible watermark method to a second visible watermark method in step S207 of FIG. 2, unlike the fourth embodiment.

In the fifth embodiment, a simple example in which an image (1602') having additional information embedded by the second visible watermark method is generated from an image (1601') having additional information embedded by the first visible watermark method will be described.

For example, when the image data 1601' shown in FIG. 6 (FIG. 7) has additional information embedded by the first visible watermarking scheme, an upper portion 1701 and lower portion 1703 are directly used to reconstruct the image 1602'. Several processing operations below are executed to construct the central portion of the image 1602'. First, a binary image 1604' having a display form (font, font size, and the like) different from that of an image 1604 in FIG. 6 is newly generated from "attached data b" (additional information). This image 1604' and each of the bit planes (12 bit planes) of the R, G, and B components of "attached data a" (1602*b*) are ORed, thereby newly obtaining a partial image 1602*b*" having the additional information embedded by the second visible watermarking scheme. When an image is reconstructed using the resultant partial image 1602", upper portion 1701, and lower portion 1703, the image 1602' having the additional information embedded by the second visible watermark method can be obtained.

As a detailed example, when detected time information is "Feb. 19, 2000", the detected attribute of the image is "the image data can be used with additional information embedded by the first visible watermarking scheme for 10 days (until Feb. 28, 2000), and after that (from Feb. 29, 2000), the image data can be used with the additional information embedded by the second visible watermarking scheme", and the determined time in step S206 (current time information in a RAM 1103) is "Feb. 29, 2000", processing advances from step S206 to step S207 as "case a". In step S207, the additional information is changed from the first visible watermark to the second visible watermark by the above-described method.

[Sixth Embodiment]

In the above embodiments, operation is performed in the host computer 1000 shown in FIG. 1, i.e., a so-called personal computer using a program for executing the above procedure, which is mainly stored in the CPU or ROM. However, the present invention is not limited to this.

Figure 8:
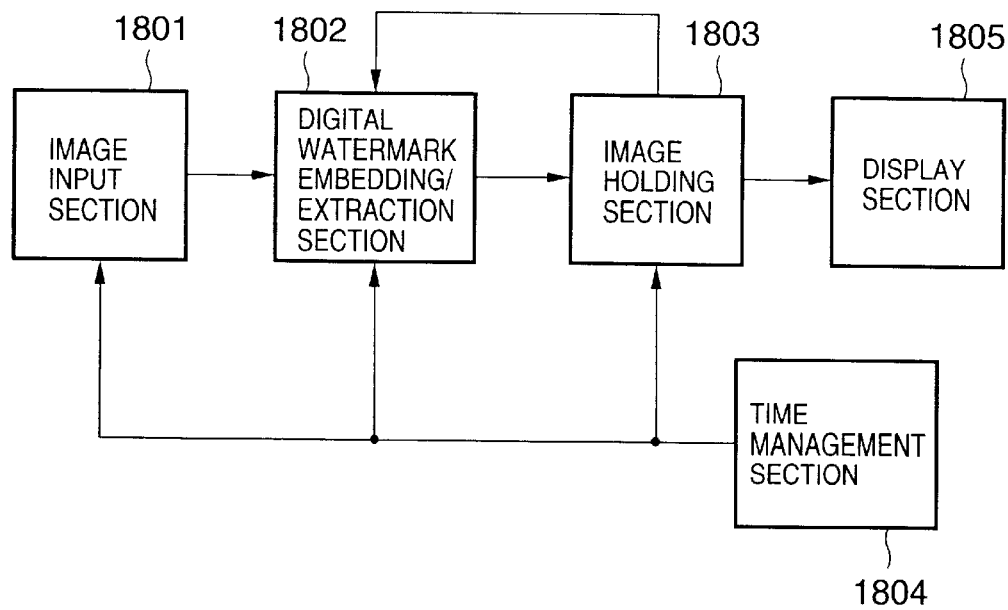
FIG. 8 is a view showing the overall arrangement of an image processing apparatus applied to the sixth embodiment of the present invention.

For example, the processing of each of the above embodiments may be executed by arranging an image input section 1801 as the image data input function in step S201 by a scanner 1002, CD 1108, FD 1109, DVD 1110, or transmission device (at the time of reception) 1112, a digital watermark embedding/extraction section 1802 as the digital watermark embedding/digital watermark information extraction/digital watermarking scheme changing (digital watermark removal) function in steps S202, S205, and S207, an image holding section 1803 as the same function as that of an HD 1104, and a time management section 1804 as the current time management function and various control functions in steps S204 to S211, as shown in FIG. 8.

[Modification to Embodiment]

The present invention is not limited to the case described in the above embodiments in which time information is held as a digital watermark. The main characteristic feature of the embodiments is that the presence/absence and scheme of a digital watermark embedded in an image are managed in consideration of a time element. Hence, the time information can be either simply attached to each image data as attached information in an encrypted/encoded state or held in the apparatus. However, when the time information is embedded in a given image as a digital watermark, as described above, the image can always be managed without making the user know the presence of the time information.

As described above, according to this embodiment, for image data having digital watermark information embedded, the digital watermark information can always be kept embedded in the image data by an optimum scheme on the basis of a time factor, the digital watermark can be removed, or the image data can be erased.

[Seventh Embodiment]

In the following embodiment, techniques capable of properly extracting a digital watermark from image data in which the digital watermark is embedded by one of embedding schemes of a number of types or versions will be described. The techniques to be described in the following embodiments can also be applied to extract or embed a digital watermark in the above embodiments.

Figure 9:
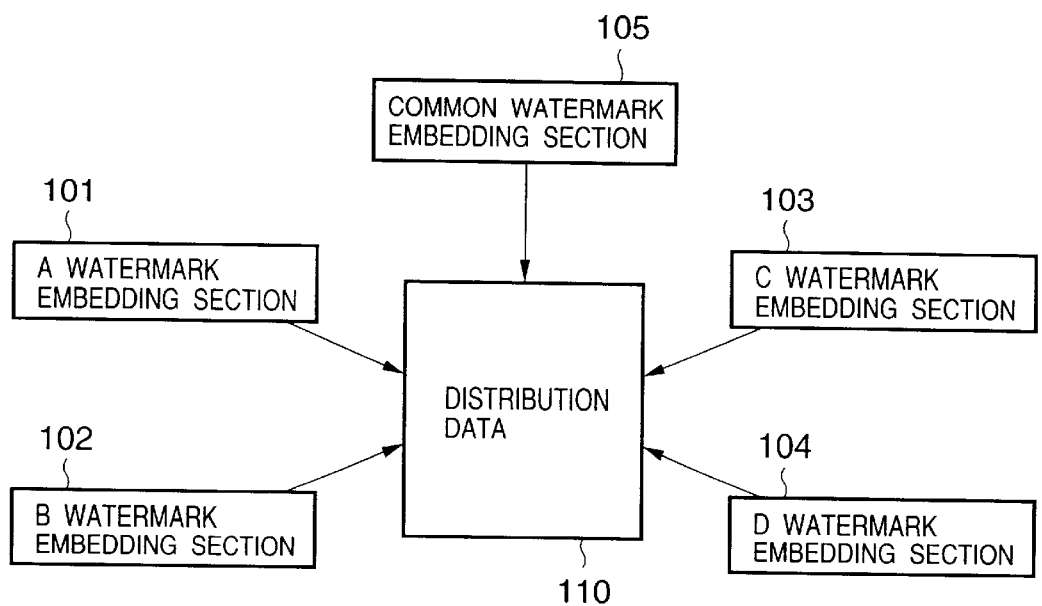
FIG. 9 is a view for explaining digital watermark embedding processing according to the seventh embodiment of the present invention.

FIG. 9 is a view for explaining digital watermark embedding processing according to the seventh embodiment of the present invention and, more particularly, an example in which watermark embedding sections for embedding watermarks by digital watermark embedding schemes of different types or versions and a common watermark embedding section for embedding a common digital watermark are arranged.

Referring to FIG. 9, reference numerals 101 to 104 denote digital watermark embedding sections for embedding watermarks by digital watermark embedding schemes of different types or versions; 105, a common watermark embedding section for embedding a digital watermark by a common scheme; and 110, data to be distributed.

The common watermark embedding section 105 has the following characteristic features.

1) The common watermark embedding section 105 embeds a resilient digital watermark using a relatively small amount of information.

2) The common watermark embedding section 105 embeds a digital watermark which can be extracted without any key or using a common key.

3) The common watermark embedding section 105 embeds information for specifying at least a digital watermarking scheme and/or its version.

4) The common watermark embedding section 105 embeds a digital watermark having resiliency against another digital watermark embedding (e.g., the embedding position is changed).

Various schemes can be employed as the common watermark embedding scheme having the above characteristic features. An example will be described below to explain the high resiliency. When input data as a copyrighted work is a still image, the image data of the still image is segmented into blocks each formed from 8×8 pixels, and DCT (Discrete Cosine Transform) is executed in units of blocks. A block that has under gone the DCT will be referred to as a DCT coefficient block, one coefficient of a DCT coefficient block will be referred to as a DCT coefficient, and a set of DCT coefficient blocks of one image will be referred to as a DCT coefficient block group.

Figure 10A:
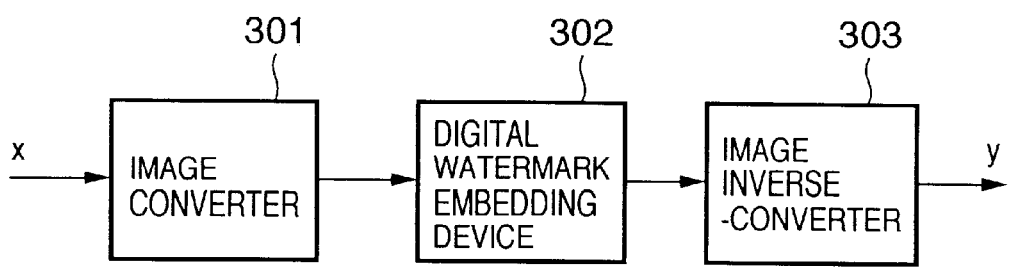
FIGS. 10A and 10B are block diagrams for explaining common digital watermark embedding and extraction according to the seventh embodiment.

FIG. 10A is a block diagram for explaining the arrangement of the common watermark embedding section 105.

Referring to FIG. 10A, an input image x undergoes the DCT by an image converter 301, and a DCT coefficient block group as an output is used as the input to a digital watermark embedding device 302. A DCT coefficient block where a digital watermark is to be embedded is selected from the DCT coefficient block group, and one DCT coefficient in the DCT coefficient block is quantized, thereby embedding one watermark bit. At this time, the magnitude of the quantization step determines the embedding strength, and the magnitude of the quantization step and the position of the selected DCT coefficient correspond to key information.

Let $s\{u,v\}$ be the value of a DCT coefficient at coordinates u and v, and h be the quantization step. According to the following rule, "0" or "1" as digital watermark bit is embedded.

A value a satisfying $$a \cdot h < s\{u,v\} \leq (a+1) \cdot h \quad (1)$$

will be obtained.

$$\text{When embed bit is 0, } c\{u,v\} = b \cdot h + h/2 \quad (2)$$

(b is an even value of a and (a+1))

$$\text{When embed bit is 1, } c\{u,v\} = b \cdot h + h/2 \quad (3)$$

(b is an odd value of a and (a+1))

With this operation, $c\{u,v\}$ is obtained as a DCT coefficient after embedding the digital watermark.

Finally, IDCT (inverse DCT) is performed for the block group using an image inverse-converter 303 to restore and reconstruct the original 8×8 blocks.

Figure 10B:
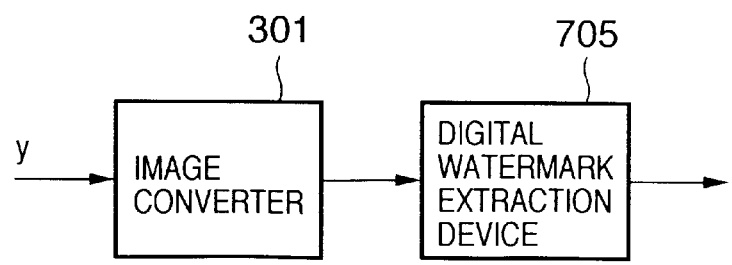

To extract the thus embedded common digital watermark, as shown in FIG. 10B, the same DCT as in embedding the digital watermark is executed using the image converter 301, and the embedded DCT coefficient is selected for the DCT coefficient block group as the output from the image converter 301 using key information to obtain a value b satisfying $$b \cdot h < c\{u,v\} \leq (b+1) \cdot h \quad (4)$$

If the value b is even, it is determined that the embedded bit is "0". If the value is odd, it is determined that the embedded bit is "1".

The following techniques can be used to increase the resiliency in such a digital watermark embedding scheme.

In selecting one DCT coefficient to be embedded from the DCT coefficient block group, when a DCT coefficient representing a low-frequency component is selected, the resiliency of the watermark can be increased. This is because high-frequency components are readily lost by image compression or various filtering operations, though low-frequency components are not.

In the above embedding scheme, one DCT coefficient block is selected, or one DCT coefficient is embedded. However, the resiliency can also be increased by increasing the number of DCT coefficient blocks or DCT coefficients. The reason for this is as follows. If one bit is simply embedded into one DCT coefficient, its value is probably lost by image compression or various filtering operations. However, when identical bits are embedded into a plurality of DCT coefficients, all the bits are hardly lost.

The resiliency can also be increased by encoding the bit itself to be embedded using an error-correction code. This is because even when some embedded bits are lost, the bits are reconstructed by the error-correction codes. Obviously, the higher the correction capability of the error-correction code is, the higher the resiliency becomes. Although these techniques increases the resiliency, low-frequency components of the image may change, or the image quality may degrade because a number of bits are embedded. In addition, the number of embeddable bits often decreases because identical bits are embedded using a number of DCT coefficients.

With an opposite operation, a digital watermark technique for a higher image quality and larger amount of embeddable information can be realized, although the resiliency becomes low.

Such tendency in the technique of increasing resiliency is observed not only in the technique using the DCT but also in a technique using the wavelet transform or Fourier transform or a technique of directly manipulating the luminance values of pixels.

The embedding procedure according to the seventh embodiment will be described next with reference to FIG. 9. In this case, information which is embedded by the common watermark embedding section 105 to specify the embedding technique (section) used to actually embed a watermark is defined as, e.g., "00 (=A)", "01 (=B)", "10 (=C)", or "11 (=D)". These pieces of information are 2-bit information for specifying the digital watermark techniques in the watermark embedding sections 101, 102, 103, and 104. However, another information may be set as these pieces of information.

First, bit information corresponding to one of the digital watermark embedding sections 101 to 104 to be used later is embedded using the common watermark embedding section 105 by the common digital watermark embedding technique having high resiliency and the characteristic features 1) to 4) for the data 110 to be distributed. After that, actual digital watermark information is embedded using one of the digital watermark embedding sections 101 to 104, which is specified by the bit information.

The order of digital watermark embedding may be reversed as long as the specified digital watermark embedding scheme and common digital watermark embedding scheme do not interfere with each other, i.e., a technique which does not affect the common digital watermark information by the specified digital watermark embedding processing is used (including changing the embedding position). In addition, the information to be embedded may be changed or unchanged for each watermark embedding technique. Various watermark information can be embedded by each technique, including copyright information, user information, and identification information.

Figure 11:
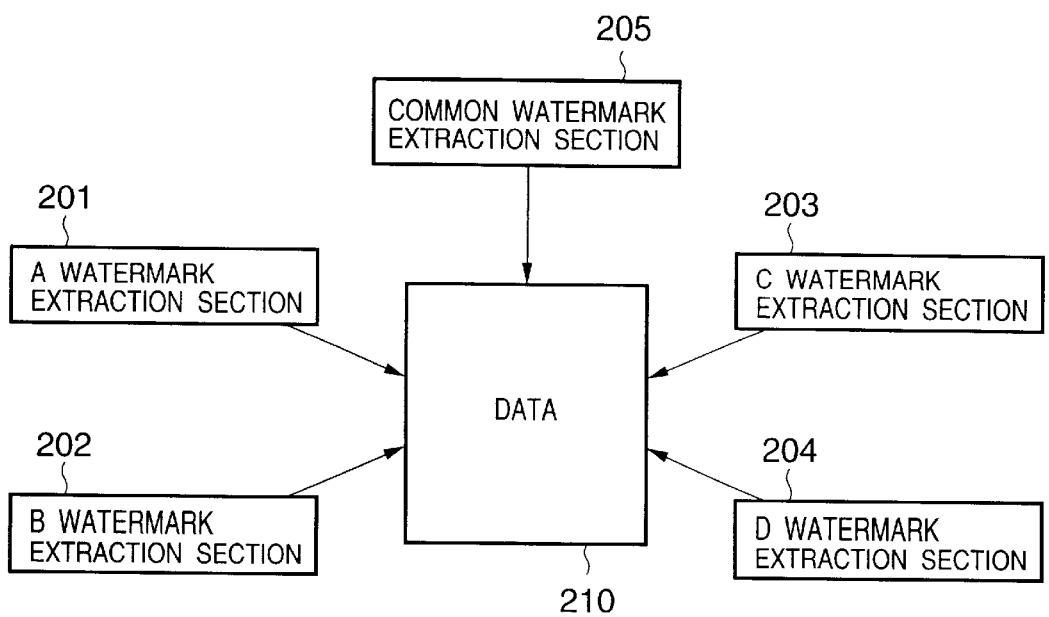
FIG. 11 is a view for explaining digital watermark extraction processing according to the seventh embodiment of the present invention.

FIG. 11 is a view showing digital watermark extraction processing according to the seventh embodiment of the present invention.

Referring to FIG. 11, digital watermark extraction sections 201 to 204 corresponding to the digital watermark embedding sections 101 to 104 shown in FIG. 9 can extract watermark information embedded by the corresponding watermark embedding sections 101 to 104. A common watermark extraction section 205 extracts a common watermark embedded in the distribution data 110 by the common digital watermark embedding section 105.

Referring to FIG. 11, if data 210 which may possibly be an illicit copy is detected or reported, watermark information embedded by a common digital watermark is extracted using the common watermark extraction section 205. With this information, the digital watermarking scheme used to embed the digital watermark and/or its version is specified, and various pieces of embedded information are extracted using one of the digital watermark extraction sections 201 to 204, which is specified by the information.

As is apparent from the seventh embodiment, digital watermark information can be efficiently extracted even in a system using different digital watermarking schemes. Additionally, even when the watermark cannot be detected, the security can be improved due to the following reasons.

If watermark information which should have been embedded in data cannot be detected, it is difficult to discriminate whether the data has no watermark information at all, a watermark is embedded by another watermark embedding scheme, or embedded watermark information is destroyed by an attack.

However, the common digital watermark of the seventh embodiment has high resiliency, and the common digital watermark information can hardly be destroyed by an attack. Hence, when watermark information by the common digital watermark is extracted, the possibility that the data has no digital watermark information at all is excluded.

Each technique can use an arbitrary digital watermark embedding scheme. However, if detailed information is embedded, the amount of embedded information is large. To suppress degradation in image quality by such a large amount of embedded information, a digital watermark is often embedded using a digital watermarking scheme with relatively low resiliency. Hence, if common digital watermark information is extracted by the common digital watermark extraction scheme, and the watermark information which should have been embedded by each watermark embedding section cannot be extracted, the embedded digital watermark information has probably been destroyed by an attack or the like.

Figure 12:
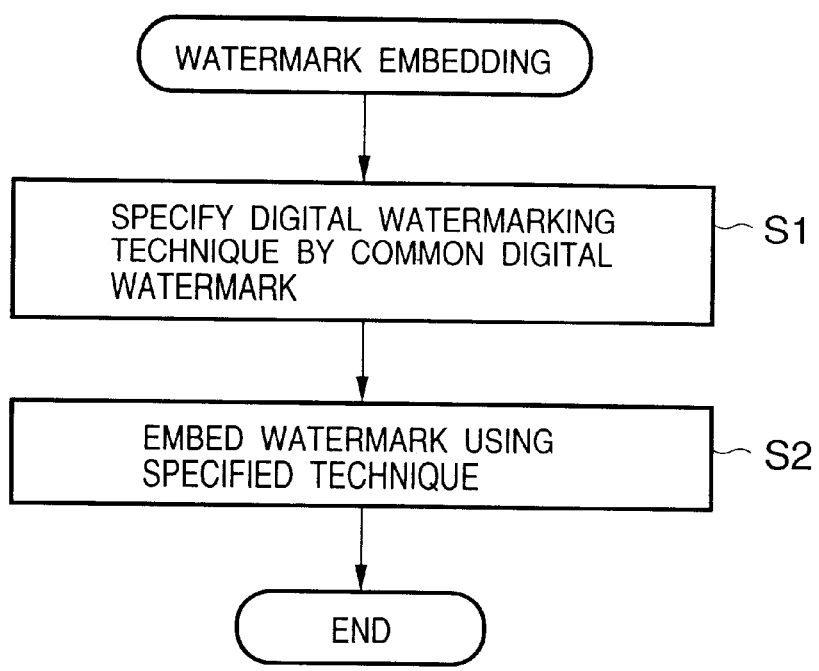
FIG. 12 is a flow chart for explaining digital watermark embedding processing according to the seventh embodiment of the present invention.

FIG. 12 is a flow chart showing digital watermark embedding processing according to the seventh embodiment.

First, a digital watermark is embedded in the distribution data 110 using the common watermark embedding section 105 in step S1. The version of the embedding scheme to be used by the digital watermark embedding section for embedding a digital watermark next is specified by the common digital watermark. The flow advances to step S2 to embed a digital watermark in the distribution data 110 using the digital watermark embedding section (one of the digital watermark embedding sections 101 to 104) of the version specified in step S1. Thus, distribution data having a digital watermark embedded can be created.

Figure 13:
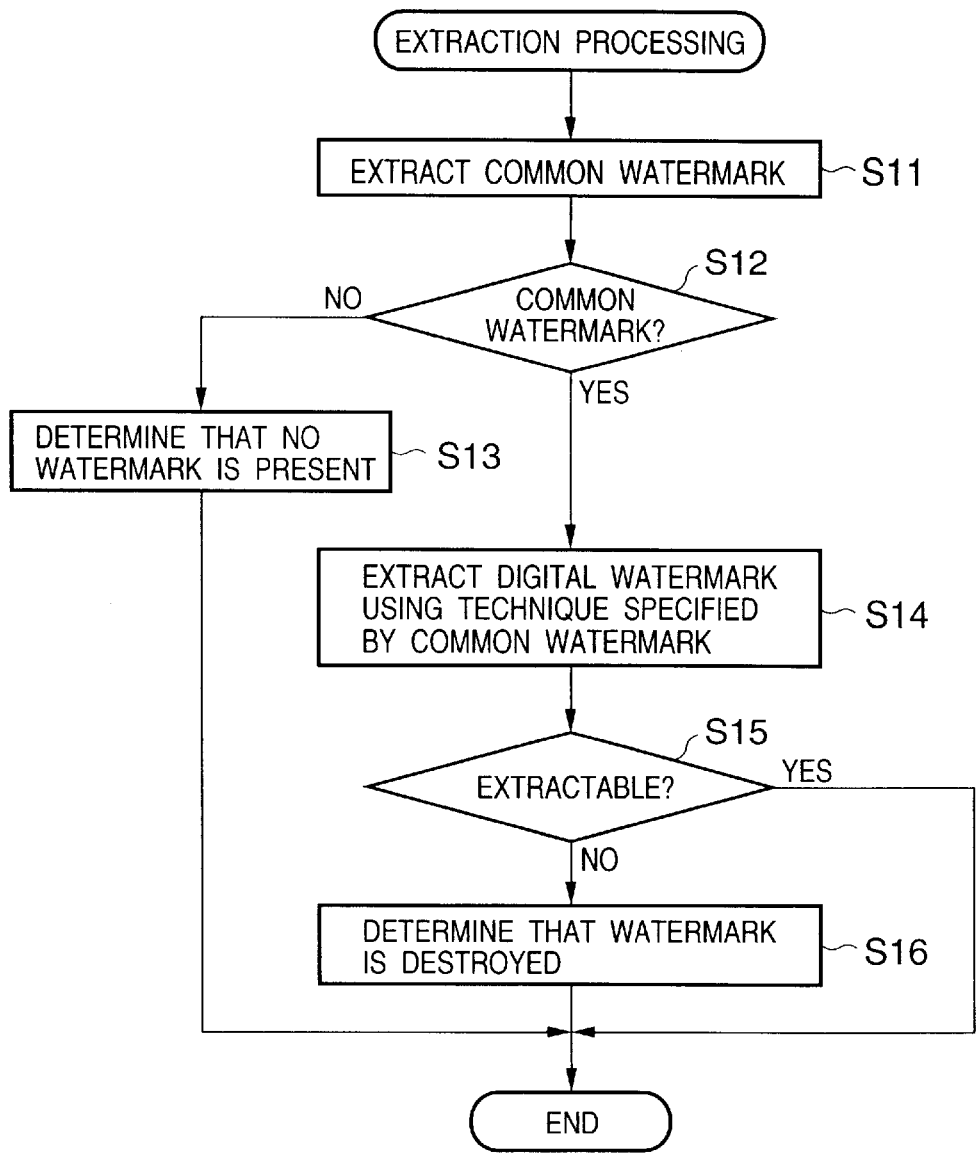
FIG. 13 is a flow chart for explaining digital watermark extraction processing according to the seventh embodiment of the present invention.

FIG. 13 is a flow chart showing processing of extracting the digital watermark for the data in which the digital watermark is embedded by the above method.

The common digital watermark embedded in the distributed data 210 is extracted in step S11. It is checked in step S12 whether the common digital watermark is extracted. If NO in step S12, the flow advances to step S13 to determine that the data 210 has no digital watermark at all, and the processing is ended.

If YES in step S12, the flow advances to step S14 to extract the digital watermark embedded by the watermark embedding technique of a version specified by the common digital watermark using a watermark extraction section (one of the digital watermark extraction sections 201 to 204) corresponding to the technique. It is checked in step S15 whether the embedded digital watermark is normally extracted. If YES in step S15, the extracted digital watermark is employed, and the processing is ended. If NO in step S15, the flow advances to step S16 to determine that the embedded digital watermark is destroyed due to some reason.

As described above, according to the seventh embodiment, common watermark information is embedded using a common watermark embedding technique with high resiliency, and the version of the embedding scheme used by the watermark technique that has actually been used to embed the watermark information is specified by the common watermark information whereby the detectability of the embedded digital watermark can be increased as compared to a case wherein the digital watermark is embedded using only one of various digital watermark embedding techniques. In addition, it can be more reliably determined whether the digital watermark has been destroyed by an attack.

In the seventh embodiment, four digital watermark embedding techniques have been exemplified. However, this embodiment can be practiced for an arbitrary number of techniques.

[Eighth Embodiment]

Figure 14:
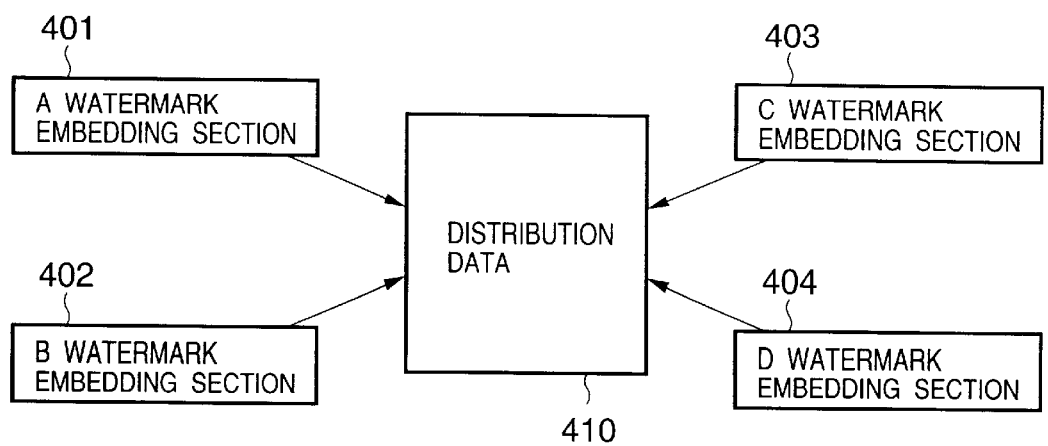
FIG. 14 is a view for explaining digital watermark embedding processing according to the eighth embodiment of the present invention.

FIG. 14 is a view for explaining digital watermark embedding processing according to the eighth embodiment of the present invention.

Referring to FIG. 14, digital watermark embedding sections 401 to 404 embed a watermark in distribution data 410 by digital watermark embedding schemes of different types or versions. As a characteristic feature, information embedded using the digital watermarking scheme of one of the digital watermark embedding sections 401 to 404 cannot be or can hardly be extracted by another digital watermarking scheme. Generally, this characteristic feature holds for different digital watermarking schemes. However, if the number of types of digital watermarking schemes of the digital watermark embedding sections 401 to 404 used is relatively small, the digital watermarking schemes can be confirmed in advance by experiments and the like, and such a combination of digital watermarking schemes can be selected.

The digital watermark embedding procedure will be described below.

Figure 16:
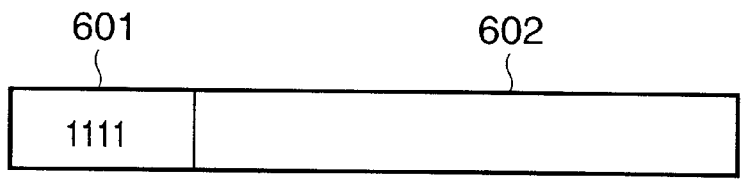
FIG. 16 is a view for explaining digital watermark information in the eighth embodiment.

A digital watermark is embedded into the distribution data 410 using one of the digital watermark embedding sections 401 to 404. The digital watermark embedding section to be employed is determined by the period for which the digital watermark embedding sections 401 to 404 are to be used, or for digital watermarking schemes with different versions, the period for which the digital watermark is to be embedded. The information embedded as the digital watermark contains information (specific information) determined by the digital watermark embedding sections 401 to 404. For example, as shown in FIG. 16, specific information (several bits) (e.g., "1111") is stored in a first embedding region 601, and individual watermark information to be actually embedded is embedded in a remaining region 602.

Figure 15:
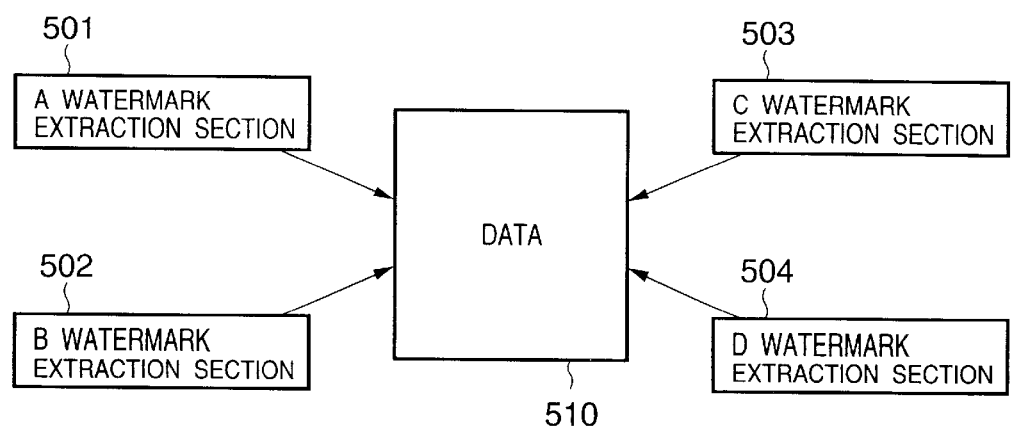
FIG. 15 is a view for explaining digital watermark extraction processing according to the eighth embodiment of the present invention.

FIG. 15 is a view for explaining digital watermark extraction processing according to the eighth embodiment of the present invention.

Referring to FIG. 15, reference numeral 501 to 504 denote digital watermark extraction sections capable of extracting watermarks embedded by the digital watermark embedding sections 401 to 404 in FIG. 14; and 510, data in which a digital watermark is embedded according to the arrangement shown in FIG. 14.

The digital watermark extraction procedure shown in FIG. 15 will be described below.

If data 510 which is assumed to be an illicit copy is detected or reported, a digital watermark embedded in the data 510 is extracted by the digital watermark extraction section 501 first. If the digital watermark cannot be extracted, a digital watermark is extracted sequentially using the digital watermark extraction sections 502 to 504. When a digital watermark is extracted by one of the extraction sections, the obtained information is used as watermark information.

When no watermark information can be obtained by any digital watermark extraction section, it is determined that the data 510 has no digital watermark information at all. Whether the extracted information is watermark information is determined in accordance with the specific information.

For example, as shown in FIG. 16, assume that it is predetermined that all the first bits (specific information) of the digital watermark are "1". In this case, when all the first bits of information extracted from the region 601 by one of the digital watermark extraction sections 501 to 504 are "1", and the information extracted from the remaining region 602 is significant information, it is determined that the extracted information is watermark information. This is because the digital watermark embedding sections 401 to 404 use exclusive watermark embedding schemes, and therefore, a digital watermark embedded by a certain watermark embedding scheme can hardly be extracted by another scheme as significant information containing such specific information.

When all the first bits of the information extracted from the region 601 by one of the digital watermark extraction sections 501 to 504 are "1", and the information extracted from the remaining region 602 is not significant information, it may be determined that the watermark information has been destroyed by an attack or the like.

Figure 17:
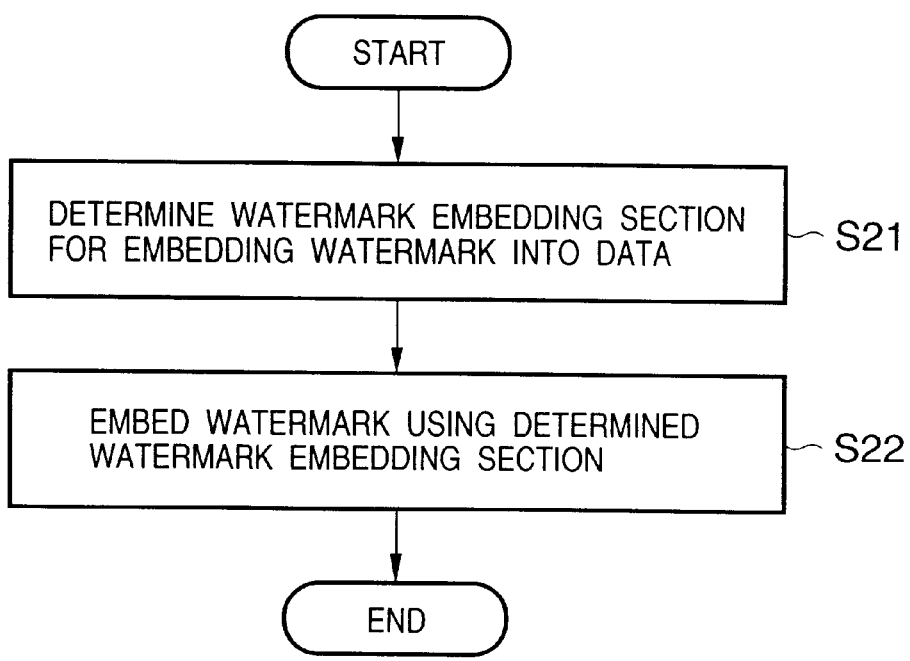
FIG. 17 is a flow chart for explaining digital watermark embedding processing according to the eighth embodiment of the present invention.

FIG. 17 is a flow chart for explaining digital watermark embedding processing according to the eighth embodiment of the present invention.

First, one of the digital watermark embedding sections 401 to 404 for embedding a digital watermark into the distribution data 410 is selected. In this selection, the digital watermark section to be selected is determined by the period for which the digital watermark embedding sections 401 to 404 are to be used, or for digital watermarking schemes with different versions, the period for which the digital watermark is to be embedded. The flow advances to step S22 to embed a digital watermark into the data 410 using the selected digital watermark embedding section. Information embedded as a digital watermark contains information (specific information in the region 601 shown in FIG. 16) determined by the digital watermark embedding sections 401 to 404.

Figure 18:
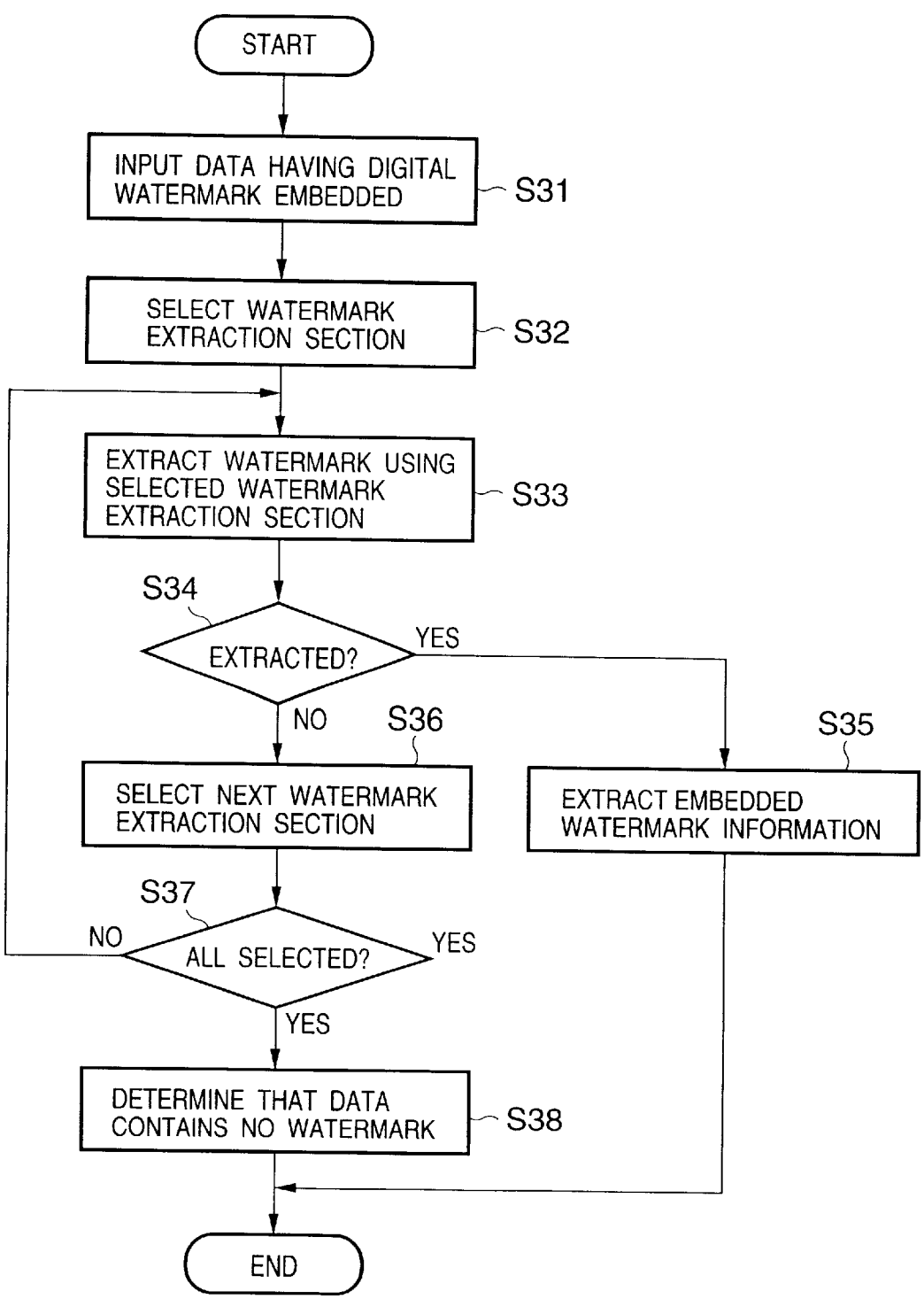
FIG. 18 is a flow chart for explaining digital watermark extraction processing according to the eighth embodiment of the present invention.

FIG. 18 is a flow chart showing digital watermark extraction processing according to the eighth embodiment.

When data 510 having a digital watermark embedded is input in step S31, the flow advances to step S32 to select the digital watermark extraction section 501 to extract the embedded digital watermark. The digital watermark embedded in the data 510 is extracted using the selected digital watermark extraction section 501 (step S33). The flow advances to step S34 to determine whether the digital watermark is extracted. If NO in step S34, the flow advances to step S36 to select one of the remaining digital watermark extraction sections 502 to 504. The flow returns to step S33 to extract the digital watermark using the selected digital watermark extraction section. When the digital watermark is extracted from the data 510 using one of the digital watermark extraction sections 501 to 504, the flow advances to step S35 to determine the obtained information as watermark information.

If the watermark information cannot be obtained using any one of the digital watermark extraction sections 501 to 504, the flow advances from step S37 to step S38 to determine that no digital watermark information is embedded in the data 510 at all. Whether the obtained information is watermark information is determined in accordance with the specific information in the region 601.

When the specific information is contained in the region 601, and the information in the region 602 is insignificant information, it may be determined that the digital watermark is destroyed.

In the above-described seventh embodiment, a plurality of digital watermark embedding schemes can be easily mixed together without depending on individual digital watermarking schemes or the number of types thereof. However, there are two problems: the common watermark embedding scheme by the common digital watermark embedding section 105 cannot be improved, and two embedding schemes, i.e., common digital watermark embedding and individual digital watermark embedding must always be executed in the digital watermark embedding processing.

To the contrary, according to the eighth embodiment, since the common digital watermarking scheme is not used, digital watermark embedding can be done using a single digital watermark embedding section, and the common digital watermark embedding scheme need not be used. It is still time-consuming when the number of types of digital watermark embedding schemes is large. However, this technique is especially effective when the number of types of embedding schemes is relatively small, or only a digital watermark embedded by a specific embedding scheme need be extracted.

As described above, according to this embodiment, even when digital watermarking schemes of different types or versions are mixed together, the embedded digital watermark can be specified, and the watermark information can be extracted. This technique can effectively and efficiently cope with a case wherein a plurality of digital watermarking schemes become available as the digital watermarking scheme is improved.

Even when no watermark cannot be detected, data security can be improved, unlike the case wherein each digital watermarking scheme is used lonely.

The version information used in the seventh and eighth embodiments can be more effectively used, because of its characteristics, in combination with the technique described in the first to sixth embodiments in which "the digital watermark embedding method is changed in accordance with a time factor".

The present invention is not limited to the apparatuses and methods for implementing the above embodiments or a method that combines the methods described in the embodiments. The present invention also incorporates a case wherein the above embodiments are implemented by supplying software program codes for implementing the above embodiments to the computer (or the CPU or MPU) of the system or apparatus and causing the computer of the system or apparatus to operate various devices in accordance with the program codes.

In this case, the software program codes themselves implement the functions of the above embodiments, and the present invention incorporates the program codes themselves and a section for supplying the program codes to the computer and, more specifically, a storage medium which stores the program codes.

As a storage medium for storing the program codes, for example, a floppy disk, hard disk, optical disk, magnetooptical disk, CD-ROM, magnetic tape, nonvolatile memory card, ROM, or the like can be used.

The present invention also incorporates the program codes not only in a case wherein the functions of the above embodiments are implemented by controlling various devices by the computer in accordance with only the supplied program codes but also in a case wherein the above embodiments are implemented when the program codes cooperates with the OS (Operating System) or another application running on the computer.

The present invention also incorporates a case wherein the supplied program codes are stored in the memory of a function expansion board of the computer or a function expansion unit connected to the computer, and the CPU or the like of the function expansion board or function expansion unit executes part or all of actual processing on the basis of the instructions of the program codes, thereby implementing the above embodiments.

The embodiments have been independently described above. However, the present invention can be applied to an arrangement that uses the arrangement of one of the embodiments or appropriately combines the arrangements of the embodiments.

The present invention is not limited to the above embodiments and various changes and modifications can be made within the spirit and scope of the present invention. Therefore, to apprise the public of the scope of the present invention, the following claims are made.

What is claimed is:

1. A data processing apparatus comprising:
   holding means for holding image data having additional information embedded as a digital watermark;
   detection means for detecting time information related to the image data; and
   change means for changing an embedding scheme for the additional information as the digital mark, from an invisible watermarking scheme to a visible watermarking scheme, on the basis of the time information detected by said detection means.

2. The apparatus according to claim 1, further comprising embedding means for embedding the additional information into the image data as the digital watermark before the image data is held by said holding means.

3. The apparatus according to claim 1, wherein the time information contains current time information corresponding to a time of the detection.

4. The apparatus according to claim 1, wherein the time information contains information related to a time limit for use of the image data held by said holding means.

5. The apparatus according to claim 1, wherein an item of the time information is information embedded as a digital watermark in the image data held by said holding means.

6. The apparatus according to claim 1, wherein said change means changes the embedding scheme from a visible watermarking scheme to an invisible watermarking scheme.

7. A data processing apparatus comprising:
   holding means for holding image data having additional information embedded as a digital watermark;
   detection means for detecting time information related to the image data; and
   change means for changing an embedding scheme for the additional information as the digital mark, from a first invisible watermarking scheme to a second invisible watermarking scheme, on the basis of the time information detected by said detection means.

8. A data processing apparatus comprising:
   holding means for holding image data having additional information embedded as a digital watermark;
   detection means for detecting time information related to the image data; and
   change means for changing an embedding scheme for the additional information as the digital mark, from a first visible watermarking scheme to a second visible watermarking scheme, on the basis of the time information detected by said detection means.

9. A data processing method comprising:
   a detection step of detecting time information related to image data having additional information embedded as a digital watermark; and
   a change step of changing an embedding scheme for the additional information as the digital watermark, from a first invisible watermarking scheme to a second invisible watermarking scheme, on the basis of the time information detected at said detection step.

10. A computer-readable storage medium which stores a data processing program for executing a data processing method, said program comprising:
    a detection step module for detecting time information related to image data having additional information embedded as a digital watermark; and
    a change step module for changing an embedding scheme for the additional information as the digital watermark, from a first invisible watermarking scheme to a second invisible watermarking scheme, on the basis of the time information detected by said detection step module.

11. A data processing apparatus for extracting digital watermark information from digital data in which the watermark information is embedded by an apparatus having:
    watermark embedding means for embedding watermark information to be embedded into the digital data; and
    common watermark embedding means for embedding, into the digital data, version information for specifying a version of an embedding scheme used by said watermark embedding means, at high resiliency,
    said data processing apparatus comprising:
    common watermark extraction means for extracting the version information embedded by said common watermark embedding means;
    specifying means for specifying, on the basis of the version information extracted by said common watermark extraction means, the version of the embedding scheme with which the watermark information is embedded into the digital data;
    selection means for selecting watermark extraction means capable of extracting watermark information corresponding to the version specified by said specifying means; and
    control means for controlling to extract the watermark information from the digital data using said watermark extraction means selected by said selection means.

12. A data processing apparatus for extracting watermark information from digital data in which the watermark information is embedded by an apparatus having:
    watermark embedding means for embedding watermark information to be embedded into the digital data;
    transformation means for performing discrete frequency transformation for the digital data;

embedding means for embedding version information for specifying a version of an embedding scheme used by said watermark embedding means at high resiliency, by quantizing a transform coefficient transformed by said transformation means; and inverse transformation means for performing inverse transformation means for the digital data having the version information embedded by said embedding means, said data processing apparatus comprising:
common watermark extraction means for extracting the version information embedded by said common watermark embedding means;
specifying means for specifying, on the basis of the version information extracted by said common watermark extraction means, the version of the embedding scheme with which the watermark information is embedded into the digital data;
selection means for selecting watermark extraction means capable of extracting watermark information corresponding to the version specified by said specifying means; and
control means for controlling to extract the watermark information from the digital data using said watermark extraction means selected by said selection means.

13. A data processing method of extracting watermark information from digital data in which the watermark information is embedded by a method having:
a watermark embedding step of embedding watermark information to be embedded into the digital data; and
a common watermark embedding step of embedding, into the digital data, version information for specifying a version of an embedding scheme used in the watermark embedding step, at high resiliency, said data processing method comprising:
a common watermark extraction step of extracting the version information embedded in the common watermark embedding step;
a specifying step of specifying, on the basis of the version information extracted in the common watermark extraction step, the watermark embedding technique with which the watermark information is embedded into the digital data;
a selection step of selecting a watermark extraction technique for extracting watermark information corresponding to the watermark embedding technique specified in the specifying step; and
a control step of controlling to extract the watermark information from the digital data using the watermark extraction technique selected in the selection step.

14. A data processing method of extracting watermark information from digital data in which the watermark information is embedded by a method having:
a watermark embedding step of embedding watermark information to be embedded into the digital data;
a transformation step of performing discrete frequency transformation for the digital data;
an embedding step of embedding version information by quantizing a transform coefficient transformed in the transformation step; and
an inverse transformation step of performing inverse transformation of the transformation step for the digital data having the version information embedded at said embedding step, said data processing method comprising:
a common watermark extraction step of extracting the version information embedded in the common watermark embedding step;
a specifying step of specifying, on the basis of the version information extracted in the common watermark extraction step, the watermark embedding technique with which the watermark information is embedded into the digital data;
a selection step of selecting a watermark extraction technique for extracting watermark information corresponding to the watermark embedding technique specified in the specifying step; and
a control step of controlling to extract the watermark information from the digital data using the watermark extraction technique selected in the selection step.

15. A computer-readable storage medium which stores a program for executing a data processing method of extracting watermark information from digital data in which the watermark information is embedded by a method having:
a watermark embedding step of embedding watermark information to be embedded into the digital data; and
a common watermark embedding step of embedding, into the digital data, version information for specifying a version of an embedding scheme used in the watermark embedding step, at high resiliency, said program comprising:
a common watermark extraction step module for extracting the version information embedded by a common watermark embedding step module;
a specifying step module for specifying, on the basis of the version information extracted by said common watermark extraction step module, a watermark embedding technique with which the watermark information is embedded into the digital data;
a selection step module for selecting a watermark extraction technique for extracting watermark information corresponding to the watermark embedding technique specified by said specifying step module; and
a control step module for controlling to extract the watermark information from the digital data using the watermark extraction technique selected by said selection step module.

16. A data processing method comprising:
a detection step of detecting time information related to image data having additional information embedded as a digital watermark; and
a change step of changing an embedding scheme for the additional information as the digital mark, from an invisible watermarking scheme to a visible watermarking scheme, on the basis of the time information detected at said detection step.

17. A data processing method comprising:
a detection step of detecting time information related to the image data having additional information embedded as a digital watermark; and
a change step of changing an embedding scheme for the additional information as the digital mark, from a first visible watermarking scheme to a second visible watermarking scheme, on the basis of the time information detected at said detection step.

18. A computer-readable storage medium which stores a program for executing a data processing method of embedding a digital watermark into digital data, said program comprising:

a detection step module for detecting time information related to the image data having additional information embedded as a digital watermark; and a change step module for changing an embedding scheme for the additional information as the digital mark, from an invisible watermarking scheme to a visible watermarking scheme, on the basis of the time information detected by said detection step module.

19. A computer-readable storage medium which stores a program for executing a data processing method of embedding a digital watermark into digital data, said program comprising:

a detection step module for detecting time information related to image data having additional information embedded as a digital watermark; and a change step module for changing an embedding scheme for the additional information as the digital mark, from a first visible watermarking scheme to a second visible watermarking scheme, on the basis of the time information detected by said detection step module.

20. A computer-readable storage medium which stores a program for extracting watermark information from digital data in which the watermark information is embedded by an apparatus having watermark embedding means for embedding watermark information to be embedded into the digital data; and common watermark embedding means for embedding, into the digital data, version information for specifying a version of an embedding scheme used by said watermark embedding means, at high resiliency, said program comprising:

a common watermark extraction step module for extracting the version information embedded by the common watermark embedding means;

a specifying step module for specifying, on the basis of the version information extracted by said common watermark extraction step module, the version of the embedding scheme with which the watermark information is embedded into the digital data;

a selection step module for selecting watermark extraction step module capable of extracting watermark information corresponding to the version specified by said specifying step module; and a control step module for controlling to extract the watermark information from the digital data using said watermark extraction step module selected by said selection step module.

* * * * *

UNITED STATES PATENT AND TRADEMARK OFFICE
CERTIFICATE OF CORRECTION

PATENT NO. : 6,707,465 B2
DATED : March 16, 2004
INVENTOR(S) : Takeshi Yamazaki et al.

It is certified that error appears in the above-identified patent and that said Letters Patent is hereby corrected as shown below:

Title page,
Item [75], Inventors, "Tokyo" should read -- Kanagawa -- (both instances)
Item [56], References Cited, OTHER PUBLICATIONS, "H. Ishizuka et al." reference, "A Digital Watermark technique" should read -- A Digital Watermark Technique --; "Transfor" should read -- Transform --; and "H. INour et al." reference, "INour" should read -- Inoue --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,707,465 B2
DATED : March 16, 2004
INVENTOR(S) : Takeshi Yamazaki et al.

It is certified that error appears in the above-identified patent and that said Letters Patent is hereby corrected as shown below:

Column 1,
Line 27, "an digital" should read -- a digital --.

Column 2,
Line 6, "January 1998)" should read -- January 1998). -- and "In the" should begin a new paragraph.

Column 10,
Line 28, "aHD 1104" should read -- an HD 1104 --.

Column 15,
Line 8, "under gone" should read -- undergone --.

Column 17,
Line 48, "instep S1." should read -- in step S1. --.

Column 20,
Line 48, "lonely." should read -- alone. --.

Column 21,
Line 11, "codes but also" should read -- codes, but also, --.
Line 13, "cooperates" should read -- cooperate --.
Lines 44, 48, 51, 54 and 57, "claim 1" should read -- claim 7 --.

Signed and Sealed this

Twenty-fourth Day of May, 2005

JON W. DUDAS
*Director of the United States Patent and Trademark Office*